(12) United States Patent
Altieri

(10) Patent No.: US 12,393,908 B2
(45) Date of Patent: *Aug. 19, 2025

(54) APPARATUS AND METHOD OF CONDUCTING A TRANSACTION IN A VIRTUAL ENVIRONMENT

(71) Applicant: Frances Barbaro Altieri, Belmont, MA (US)

(72) Inventor: Frances Barbaro Altieri, Belmont, MA (US)

( * ) Notice: Subject to any disclaimer, the term of this patent is extended or adjusted under 35 U.S.C. 154(b) by 260 days.

This patent is subject to a terminal disclaimer.

(21) Appl. No.: 17/865,048

(22) Filed: Jul. 14, 2022

(65) Prior Publication Data
US 2022/0351124 A1    Nov. 3, 2022

Related U.S. Application Data

(60) Division of application No. 17/186,463, filed on Feb. 26, 2021, now Pat. No. 11,449,829, which is a
(Continued)

(51) Int. Cl.
*G06Q 10/00* (2023.01)
*G06Q 10/087* (2023.01)
(Continued)

(52) U.S. Cl.
CPC .......... *G06Q 10/087* (2013.01); *G06Q 30/06* (2013.01); *G06Q 30/08* (2013.01); *G06Q 50/01* (2013.01); *H04N 7/183* (2013.01); *H04N 23/60* (2023.01)

(58) Field of Classification Search
None
See application file for complete search history.

(56) References Cited

U.S. PATENT DOCUMENTS 6,061,462 A    5/2000    Tostevin et al.
6,393,134 B1   5/2002    Tostevin et al.
(Continued)

OTHER PUBLICATIONS

Non-Final Office Action issued in U.S. Appl. No. 13/629,198 on Sep. 18, 2013.
(Continued)

*Primary Examiner* — Fateh M Obaid
(74) *Attorney, Agent, or Firm* — Edwards Neils LLC; Jean C. Edwards, Esq.

(57) ABSTRACT

The present invention relates to a method of training a user in a virtual environment, including: maintaining, using a training engine of a computer system, a plurality of training materials, educational information, tests, or information pertaining to training in merchandising of a merchandising application stored in a thematic content database of a training database; wherein the training engine is connected to a thematic application engine of a thematic application of the computer system, and communicates to the thematic application engine via an artificial intelligence engine of the computer system; providing for a user, using the training engine, information including a plurality of written material, tests, accounting projections, what-if scenarios, videos, or platforms for live discussions or chat sessions using a chat technology component connected to the thematic application; and storing in the thematic content system database of the training database, the information provided for the user by the training engine.

12 Claims, 11 Drawing Sheets

Related U.S. Application Data continuation of application No. 16/571,811, filed on Sep. 16, 2019, now Pat. No. 10,936,994, which is a continuation of application No. 14/947,357, filed on Nov. 20, 2015, now Pat. No. 10,453,027, which is a continuation of application No. 13/629,198, filed on Sep. 27, 2012, now Pat. No. 9,225,880.

(60) Provisional application No. 61/626,416, filed on Sep. 27, 2011.

(51) Int. Cl.
    *G06Q 30/06*     (2023.01)
    *G06Q 30/08*     (2012.01)
    *G06Q 50/00*     (2012.01)
    *H04N 7/18*     (2006.01)
    *H04N 23/60*     (2023.01)

(56) References Cited

U.S. PATENT DOCUMENTS

| | | | |
|---|---|---|---|
| 6,473,794 B1 * | 10/2002 | Guheen | H04L 43/50 |
| | | | 709/224 |
| 7,373,317 B1 | 5/2008 | Kopelman et al. | |
| 7,499,584 B2 | 3/2009 | Delaney | |
| 7,769,221 B1 | 8/2010 | Shakes et al. | |
| 8,024,230 B2 | 9/2011 | Zeinfeld et al. | |
| 8,228,325 B2 | 7/2012 | Barbaro Altieri | |
| 8,271,365 B2 | 9/2012 | Jung et al. | |
| 8,342,932 B2 | 1/2013 | Fleckenstein | |
| 8,473,382 B2 | 6/2013 | Jung et al. | |
| 9,158,794 B2 | 10/2015 | Higgins et al. | |
| 9,400,987 B2 | 7/2016 | Nair et al. | |
| 2002/0026391 A1 | 2/2002 | Laster et al. | |
| 2002/0052803 A1 | 5/2002 | Amidhozour et al. | |
| 2004/0064351 A1 * | 4/2004 | Mikurak | G06Q 30/0269 |
| | | | 705/22 |
| 2004/0181819 A1 | 9/2004 | Theiste et al. | |
| 2004/0193441 A1 | 9/2004 | Altieri | |
| 2005/0038666 A1 | 2/2005 | Theiste et al. | |
| 2006/0041443 A1 | 2/2006 | Horvath, Jr. | |
| 2007/0057817 A1 | 3/2007 | Aman | |
| 2007/0279494 A1 | 12/2007 | Aman et al. | |
| 2008/0017722 A1 * | 1/2008 | Snyder | G06Q 10/00 |
| | | | 235/494 |
| 2009/0150373 A1 | 6/2009 | Davis et al. | |
| 2009/0177644 A1 | 7/2009 | Martinez et al. | |
| 2009/0248738 A1 | 10/2009 | Martinez et al. | |
| 2009/0292595 A1 | 11/2009 | Tonnison et al. | |
| 2010/0042510 A1 | 2/2010 | Zeinfeld et al. | |
| 2011/0035287 A1 | 2/2011 | Fox | |
| 2011/0035594 A1 | 2/2011 | Fox | |
| 2012/0037700 A1 | 2/2012 | Walji et al. | |

OTHER PUBLICATIONS

Final Office Action issued in U.S. Appl. No. 13/629,198 on Apr. 29, 2014.

Non-Final Office Action issued in U.S. Appl. No. 13/629,198 on Sep. 25, 2014.

Non-Final Office Action issued in U.S. Appl. No. 13/629,198 on Jan. 14, 2015.

Non-Final Office Action issued in U.S. Appl. No. 14/947,357 on Feb. 20, 2018.

Final Office Action issued in U.S. Appl. No. 14/947,357 on Nov. 8, 2018.

Non-Final Office Action issued in U.S. Appl. No. 16/571,811 on Oct. 6, 2020.

Non-Final Office Action issued in U.S. Appl. No. 17/186,463 on Feb. 3, 2022.

* cited by examiner

APPARATUS AND METHOD OF CONDUCTING A TRANSACTION IN A VIRTUAL ENVIRONMENT

CROSS-REFERENCE TO RELATED APPLICATIONS

The present application is a Divisional Application of U.S. patent application Ser. No. 17/186,463, filed Feb. 26, 2021, now U.S. Pat. No. 11,449,829, which is a Continuation Application of U.S. patent application Ser. No. 16/571,811, filed Sep. 16, 2019, now U.S. Pat. No. 10,936,994, which is a Continuation Application of U.S. patent application Ser. No. 14/947,357, filed Nov. 20, 2015, now U.S. Pat. No. 10,453,027, which is a Continuation Application of U.S. patent application Ser. No. 13/629,198, filed Sep. 27, 2012, now U.S. Pat. No. 9,225,880, which claims the benefit of U.S. Provisional Patent Application No. 61/626,416, filed on Sep. 27, 2011, the contents of all of which are herein incorporated by reference in their entirety.

BACKGROUND OF THE INVENTION

1. Field of the Invention

The present invention relates to an apparatus and method for conducting a transaction—such as the purchase of goods and services—in a virtual environment, which further incorporates online auctions, inventory management of real-life goods, a bartering system between two or more individuals, an automatic mark-down and mark-up of tagged items displayed for sale, and the automatic checking of credit using existing credit and banking systems, or other types of systems.

2. Description of Related Art

Virtual environments, especially social platforms and games are being used in multiple ways to introduce products, services, education, advertising, business models, and medical procedures as well as other types of goods and services, to consumers. The integration of two-dimensional (2D) and three-dimensional (3D) images, holograms, video, music in different formats, satellite transmission, global positioning system (GPS), and still images, objects, and photographs, into computer applications, are becoming the mainstream.

However, despite the plethora of products and services available for consumers, the actual sale of goods and services in a virtual environment that supports a commercial or game application, in 3D, or which supports, incorporates, or ties into inventory systems, has not yet been explored. Another component that is not supported in present virtual environments is the ability to mark-up and mark-down merchandise based on a date-tag system or the loss of a tag, have live auctions, and the ability to barter between two or individuals in a real life environment, or users who are playing in a virtual game environment. Thus, the present invention would fill such a need in the present virtual environment schema.

SUMMARY OF THE INVENTION

The present invention is directed to an apparatus and method for conducting a transaction—such as the purchase of goods and services—including the collection, conversion, storage, tagging and the integration of a live inventory system, mark-up, mark-down system, live auction, and bartering system in an interactive software application, virtual world, social network, commercial and/or game application, which provides a real world experience to the user.

The present invention allows an individual to activate either the actual retail application for purchase of real life goods or a gaming application. The technology also allows the user to merge the two worlds of live transmitted worlds and the virtual worlds. Thus, anyone who wants to sell merchandise has the ability to capture the images for sale from a camera, video camera or any type of capturing input device (i.e., cell phone etc.) and upload it to the main system to be tagged, marked, inventoried, and placed for sale. The present invention utilizes a QIE engine that manages different types of input: 3D, 2D, Holographics, Video, Voice, and other type of input processing the information and outputs to any device including computer screen, holographic globe, cell phone, PDA, and through any type of box, black box, projection system, wall, floor, etc.

In one embodiment, the user may attend a runway or fashion show, attend an auction and view the items for sale in real-time, attend a concert and purchase music—all in a virtual environment that has a real-life component.

In one embodiment, the present invention allows the user to try on merchandise, by showing the user in the selected items.

In one embodiment, the user may use a bartering function to barter items with other users.

In one embodiment, a store locator allows the user to identify stores at which the user may sell merchandise.

In one embodiment, the user can leave the store environment and walk down the street, which will simulate the real-life environment, and allow the user to walk into stores and buildings and see a virtual or real-world representation of same.

In one embodiment, merchandise can be tracked throughout the virtual environment.

Thus has been outlined, some features consistent with the present invention in order that the detailed description thereof that follows may be better understood, and in order that the present contribution to the art may be better appreciated. There are, of course, additional features consistent with the present invention that will be described below and which will form the subject matter of the claims appended hereto.

In this respect, before explaining at least one embodiment consistent with the present invention in detail, it is to be understood that the invention is not limited in its application to the details of construction and to the arrangements of the components set forth in the following description or illustrated in the drawings. Methods and apparatuses consistent with the present invention are capable of other embodiments and of being practiced and carried out in various ways. Also, it is to be understood that the phraseology and terminology employed herein, as well as the abstract included below, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the methods and apparatuses consistent with the present invention.

DESCRIPTION OF THE INVENTION

The present invention is directed to an apparatus and method for conducting a transaction—such as the purchase of goods and services—including the collection, conversion, storage, tagging, and the integration of a live inventory system, mark-up, mark-down system, finding store location(s), live auction, and bartering system in an interactive software application, virtual world, social network, commercial and/or game application, which provides a real world experience to the user.

The present application incorporates by reference in its entirety herein, co-pending U.S. patent application Ser. No. 10/272,408, filed Oct. 16, 2002, and Ser. No. 13/137,299, filed Aug. 4, 2011, and U.S. Pat. Nos. 7,373,377, 8,225,220, and 8,228,325.

Physical Architecture a. Client System

Figure 1:
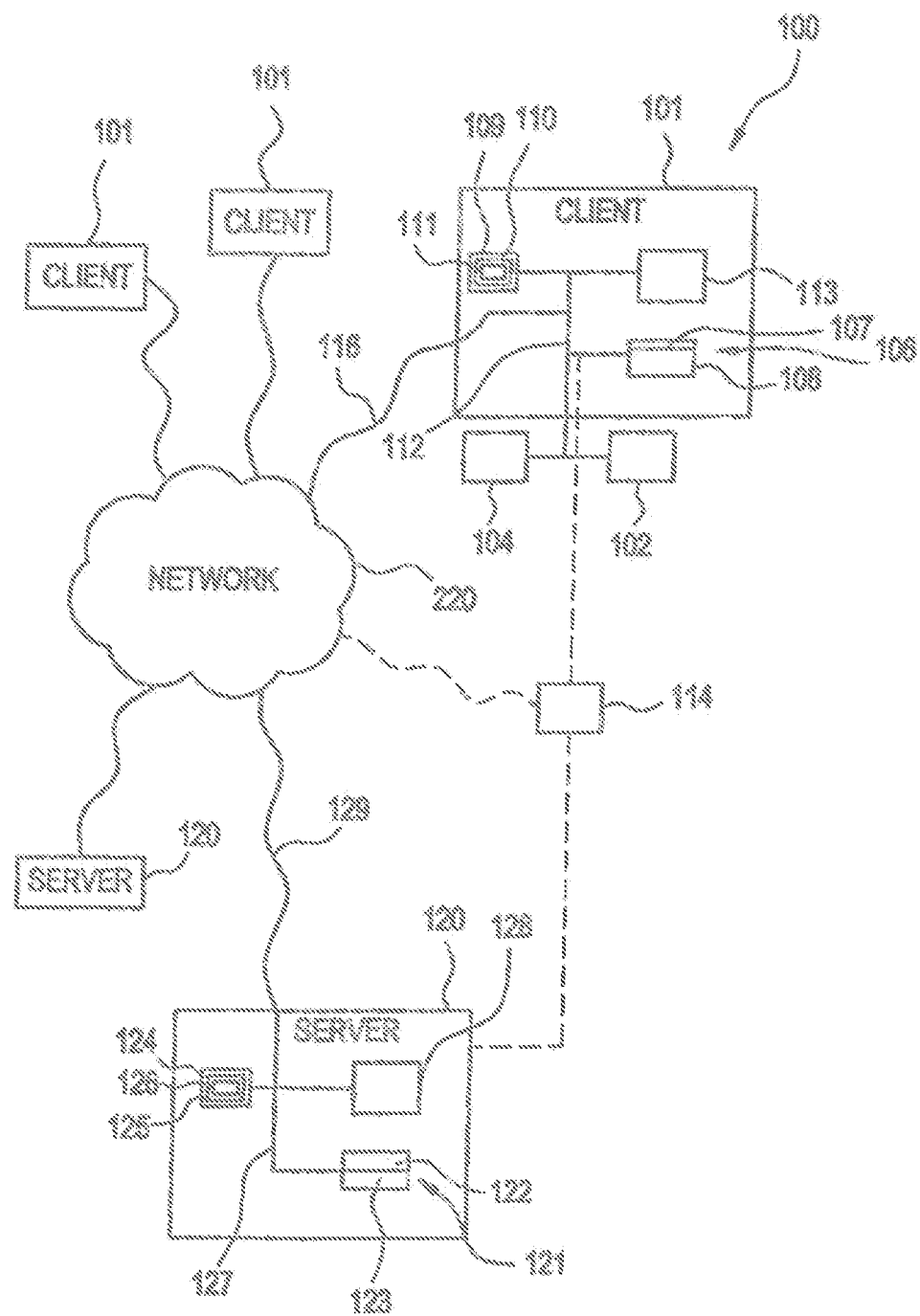
FIG. 1 is a schematic drawing of the client-server environment, according to one embodiment consistent with the present invention.

The system 100 of the present invention may include a client 101 (see FIG. 1) which may be a personal computer (PC), a mobile terminal, such as a mobile computing device, a mobile phone, or a mobile data organizer (i.e., personal data assistant (PDA)), operated by the user accessing the software program of the present invention remotely from the client 101, or any other digital device that has a display screen and database storage.

The client computer 101 typically includes a processor 106 as a client data processing device or means, the processor 106 including a central processing unit (CPU) 107 and an input/output (I/O) interface 108, a memory 109 with a software program 110 having a data structure 111, all connected by a bus 112, as well as an input device 104 or means, a display 102, and may also include a secondary storage device 113. The bus 112 may be internal to the client 101 and may include an adapter to a keyboard 104 or input device or may include external connections.

The processor 106 at the client 101 may be internal or external thereto, and executes a program 110 adapted to predetermined or programmed operations. The processor 106 has access to the memory 109, in which may be stored at least one sequence of code instructions comprising the program 110 and the data structure 111 for performing predetermined or programmed operations. The memory 109 and program 110 may be located within the client 101 or external thereto in an external database storage 114.

The program 110 can include a separate program code for performing a desired operation, or may be a plurality of modules (not shown), such as those described below, performing sub-operations of an operation, or may be part of a single module of a larger program 110 providing the operation.

The processor 106 may be adapted to access and/or execute a plurality of programs 110 corresponding to a plurality of operations. An operation rendered by the program 110 may be, for example, supporting the user interface, performing e-mail applications, etc.

The data structure 111 may include a plurality of entries, each entry including at least a storage area that stores the databases or libraries mentioned above with respect to the logical architecture.

The storage area 113, 114 or device stores at least one data file, such as text files, data files, audio, video files, etc., in providing a particular operation. The data storage device 113, 114 or means, may, for example, be a database 113, 114, including a distributed database 114 connected via a network, for example. The storage device 113, 114 may be connected to the server 120 and/or the client 101, either directly or through a communication network, such as a local area network (LAN) 220 or wide area network (WAN), or the internet. An internal storage device 113, or an external storage device 114 is optional, and data may also be received via a network 220 or the internet and directly processed.

Methods and systems consistent with the present invention are carried out by providing an input means 104, or user selection means 104, including "hot clickable" icons etc., selection buttons, in a menu, dialog box, or a roll-down window of an interface provided at the client 101, and the user may input commands through a keyboard, pen, stylus, mouse, speech processing device or means, touch screen, or other input/selection devices or means 104. The selection device 104 or means may also include a dedicated piece of hardware or its functions may be executed by code instructions executed on the client processor 106, involving a display unit 102 for displaying a selection window and a keyboard 104 for entering a selection, for example.

In methods and systems consistent with the present invention, the client 101 is connected to other clients 101 or servers 120 via a communication link 116 as a client communication device 116 or means, using a communication end port specified by an address or a port, and the communication link 116 may include a mobile communication link, a switched circuit communication link, or may involve a network 220 of data processing devices such as a LAN, WAN, the Internet, or combinations thereof. The communication link 116 may be an adapter unit capable to execute various communications protocols in order to establish and maintain communication with the server 120, for example. The communication link 116 may be constituted by a specialized piece of hardware or may be realized by a general CPU executing corresponding program 110 instructions. The communication link 116 may be at least partially included in the processor 106 executing corresponding program 110 instructions. The client system 101 may include communications via a wireless service connection.

b. Server System

In one embodiment consistent with the present invention, if a server 120, or servers 120, are used in a non-distributed environment, the (each) server (see FIG. 1) would include a processor 121 having a CPU 122 which is a server data processing means, and an I/O interface 123, but may also be constituted by a distributed CPU including a plurality of individual processors 121 on one or a plurality of machines. The processor 121 of the server 120 may be a general data processing unit, but preferably a data processing unit with large resources (i.e., high processing capabilities and a large memory 124 for storing large amounts of data).

The server 120 would also include a memory 124 with program 125 having a data structure 126 all connected by a bus 127. The bus or similar connection line can also include external connections, if the server 120 is a distributed system. The server processor 121 may have access to a storage device 128 for storing preferably large numbers of programs 110 for providing various operations to the users, as well as the external storage 114.

The data structure 126 may include a plurality of entries, each entry including at least a storage area which stores information, but may also have alternative embodiments including that associated with other stored information as one of ordinary skill in the art would appreciate.

The server 120 may be a single unit or may be a distributed system of a plurality of servers 120 or data processing units, and may be shared by multiple users in direct or indirect connection to each other. The server 120 performs at least one server program 125 for a desired operation, which is required in serving a request from the client 101.

Figure 2:
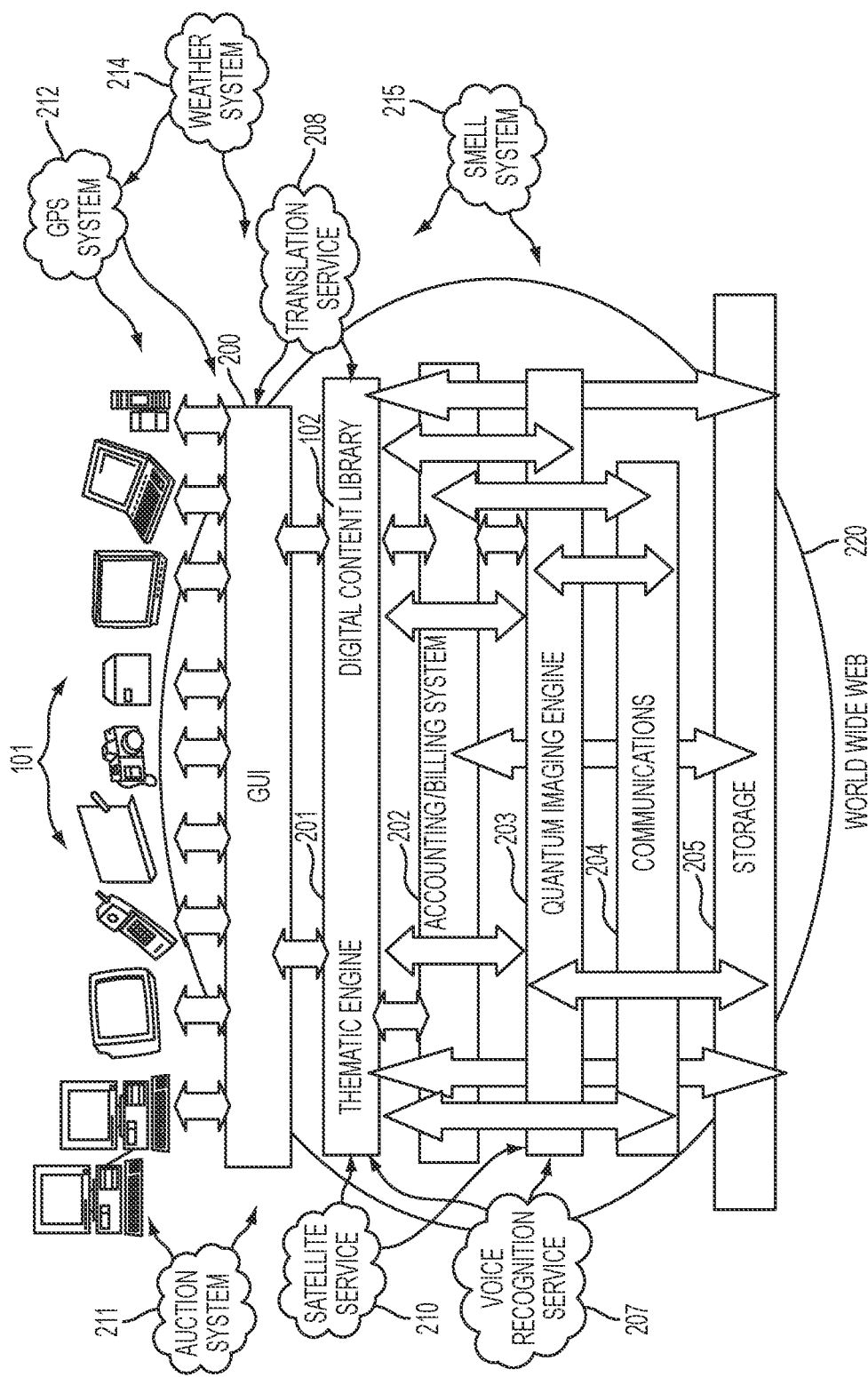
FIG. 2 is a schematic drawing of an overall interaction of major components of the present invention.
Figure 5:
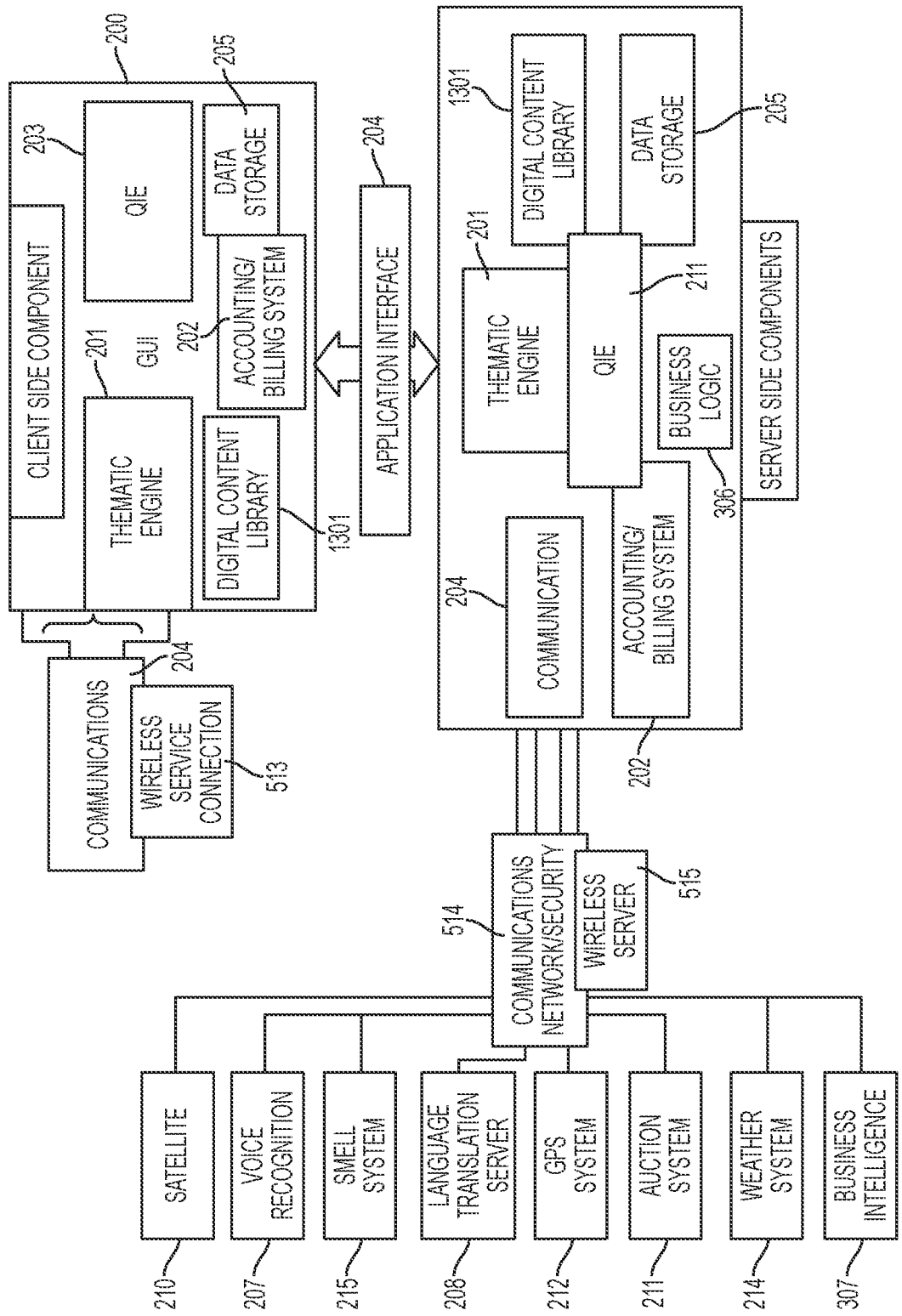
FIG. 5 is a schematic diagram of a client and server with major components, according to one embodiment consistent with the present invention.

The communication link 129 from the server 120 may be preferably adapted to communicate with a plurality of clients 101. The server 120 system may include communications with network/security features 514 (see FIGS. 2 and 5), via a wireless server 515, which connects to, for example, a satellite system 210, voice recognition system 207, business intelligence system 320, language translation service 208, and global positioning system (GPS) 212. However, one of ordinary skill in the art would know that other systems may be included, such as an auction system 211, weather system 214, smell system 215, etc. A synthesized smell device 215 can output odors such as smells for perfume, for example. The synthesized smell device 215 and the present invention can be connected via the internet and currently available supportive devices.

The server program 125 may relate to providing a number of operations related to online commercial applications.

c. Client-Server Environment

Figure 11:
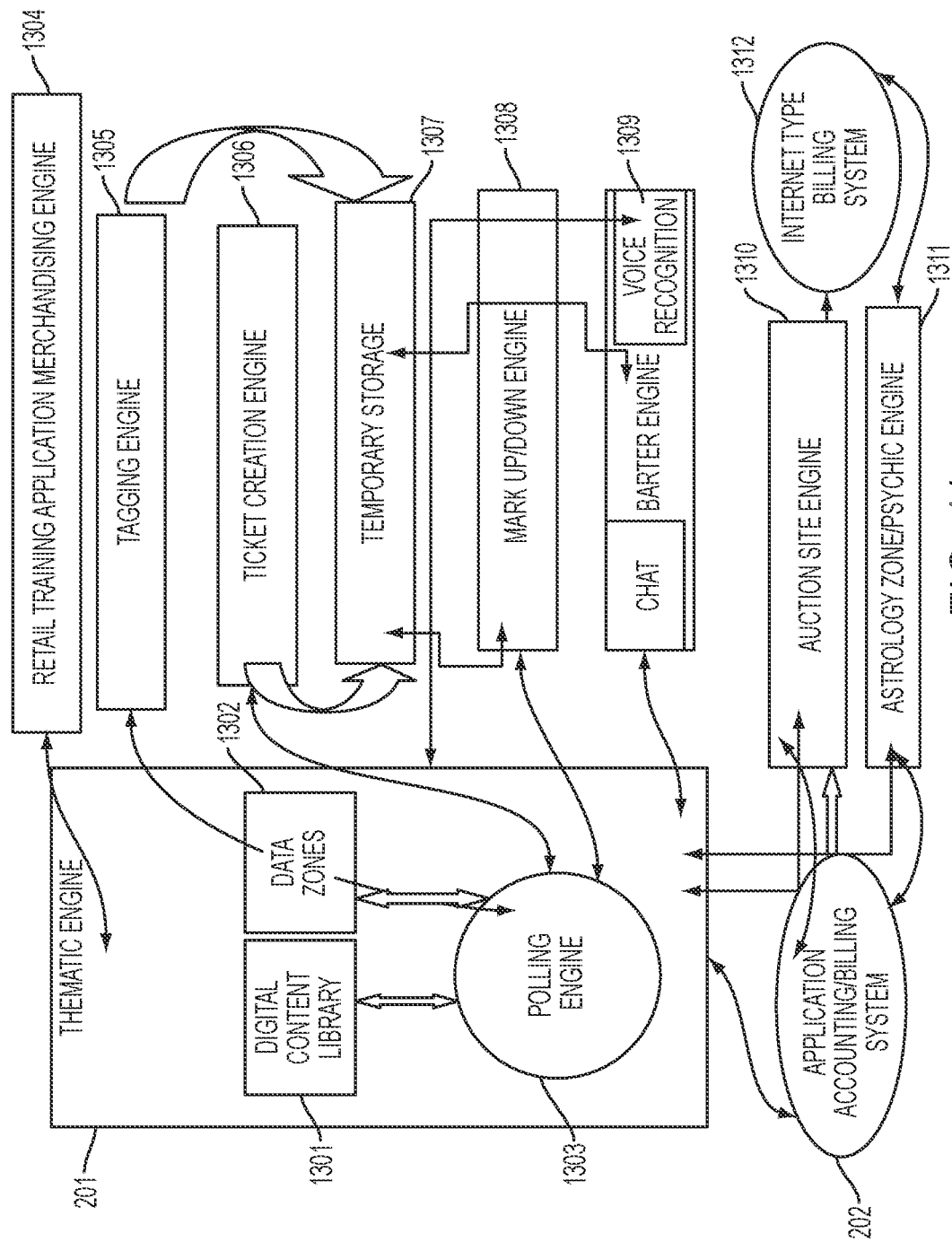
FIG. 11 is a schematic diagram of the thematic application environment connecting to and processing information from different engines, according to one embodiment consistent with the present invention.

The virtual platform of the present invention includes a graphical user interface (GUI) 200 (see FIG. 2), Thematic Engine 201 which includes a Digital Content Library 1301 (see FIG. 11), a Polling Engine 1303, and Data Zones 1302, for example, which may communicate with Communications 204 (i.e., a communication link), an Accounting/Billing system 202, and a Data Storage 205. Specifically, in one embodiment, the present invention may be presented in a client-server arrangement, or in a distributed environment. The client system 101 includes components such as a graphical user interface (GUI) 200, and may contain a Quantum Imaging Environment (QIE) 203, and Thematic Engine 201. The client system 101 interacts with the server system 120 via an Application Interface 504 (see FIG. 5).

In particular, the program of the present invention is in a Quantum Imaging Environment (QIE) 203. The QIE 203 includes an interpreter that will allow data to be transmitted to any device 101, and is the basis for the design structure and layout for applications. The QIE 203 allows developers to develop objects and applications from the interpreter for virtual environments (i.e., retail, gaming, auction, or other thematic environments), the representation of the layout and design may be in the representation of "zones", and the layout and design may be set up as zones and content, for retail, educational purposes, etc. The QIE 203 pertains to the most common denominator—the application architecture, and the content. The QIE 203 is an interpreter that will take all of the rich content, interpret the information into objects to be manipulated and accessed via any device and place these objects or information in the appropriate format that is designed or will be designed by the developer.

The QIE 203 interacts with the Accounting/Billing system 202, Data Storage 205 and Communications 204, as well as the Digital Content Library 1301 of the Thematic Engine 201. The data may be manipulated in object form or some other form that would be accessed, manipulated and interpreted on any digital device.

The QIE 203 system is designed around Open Source technologies, but can include custom software developed in an open standards environment. By using Open Source and proprietary technologies with generic APIs, the present invention is scalable as the numbers of users increase, and the advances can be programmed as Open Source technologies.

In another embodiment, the QIE 203 engine is located on a main computer client-server system (see FIG. 5) working over the internet 220, intranet, cloud, etc., that includes a minimum of a storage device, an arithmetic processor or high level processing chip that can process different levels of algorithms such as fractals, polynomials, linear based calculations, etc., a communication link, and an AI engine.

The QIE 203 collects content from the real world (i.e., content from the vendor's websites, information on time, weather, late-breaking news, etc.) and injects this content into the thematic virtual world through the Thematic Engine 201.

The GUI 200 is a lightweight client application written to run on existing computer operating systems which may be ported to other PC software, personal digital assistants (PDAs), and cell phones, and any other digital device that has a screen or visual component and appropriate storage capability. The GUI 200 contains an engine for providing graphic hardware capabilities, graphic memory and structures, controls graphic object rendering on hardware, creates/manipulates 2D and/or 3D objects, video objects, streaming video, web objects, lines, rectangles, spheres, vectors, matrices, etc., manipulates animation, colors, bitmaps, textures, images, defines coordinate system and defines world boundaries, defines frames, bounding boxes, camera angles and views, lighting and shadowing etc., provides plug-in extensions, user input stream, event triggers, error handling, management of voice, music, and other graphic and voice formats, voice recognition, and translation services drivers, for example.

Figure 3:
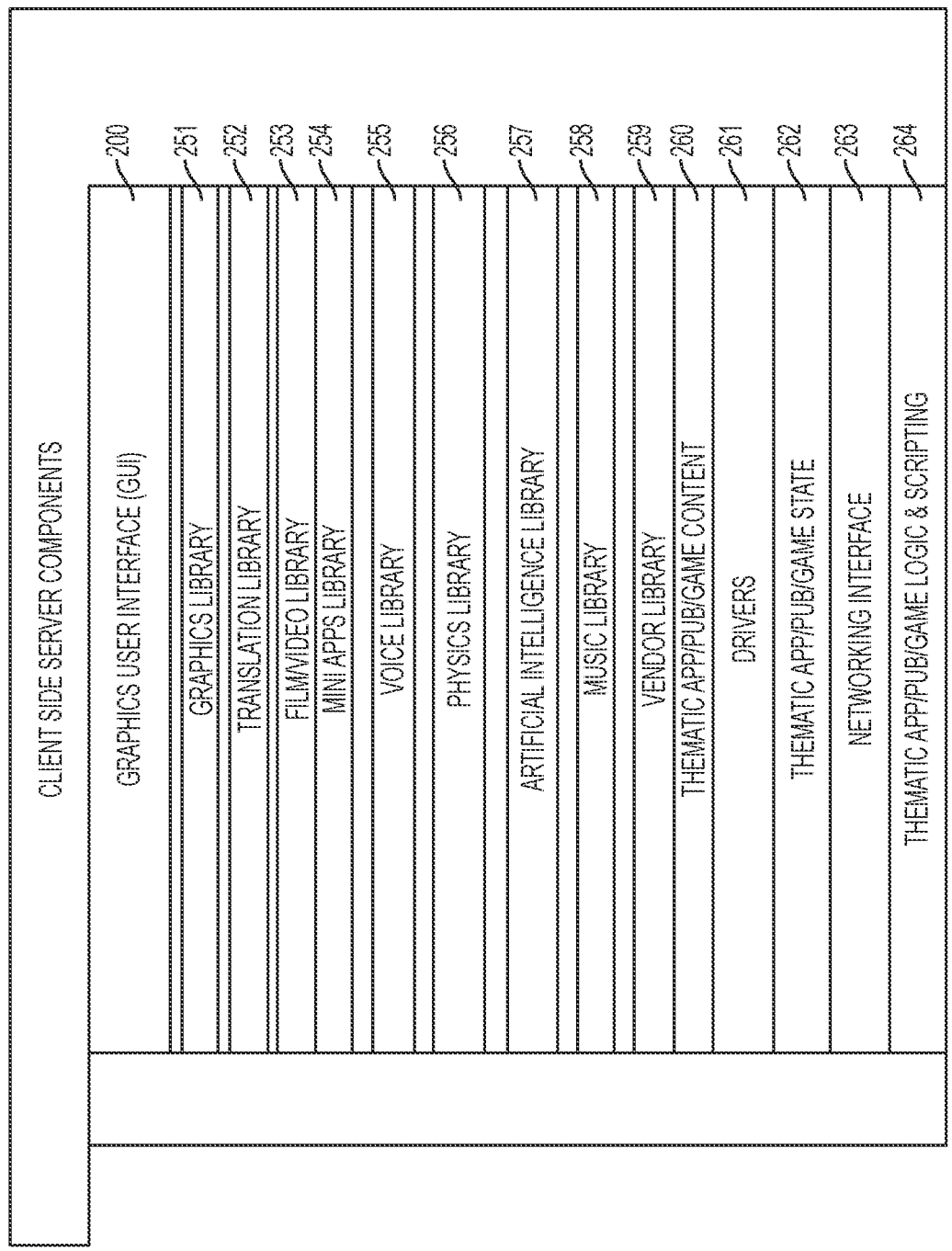
FIG. 3 is a schematic diagram of client-side components, according to one embodiment consistent with the present invention.

In particular, the graphics engine 251 (see FIG. 3) of the GUI 200 is responsible for manipulating graphic content including rendering 2D and/or 3D objects, avatars, and background images. The graphics engine 251 of the GUI 200 takes such objects and renders them into a 2D/3D space for display on the output device 102, or it can display the objects in a system that provides a holographic environment for the manipulation of images. The graphics engine 251 is also responsible for handling lighting, camera positioning, and shading. The graphics engine 251 of the GUI 200 takes into consideration graphic device display capabilities and acceleration features. One side task of the graphics engine 251 of the GUI 200 is to collect user input and provide it to the Thematic Engine 201, for example.

The GUI 200 engine pours in real world content rendered in HTML, XML, RDF, and/or QIE-rendering format or any content format. The user interacts completely with the GUI 200, beginning with login into the virtual environment, in user help, etc. The GUI 200 also interacts or connects to the Thematic Engine 201 and an object-oriented database management system (ODDBM), and/or content management system. The GUI 200 also has all the data related to the user's manipulation of the selection device 104 or means, including any keyboard strokes, use of a pen, joystick, interactive goggles, touch screen, or any other interactive hardware component that would allow the user the ability to move objects, people, etc.

In addition to the graphics library 251, the GUI 200 includes a translation library 252, a film/video library 253, a mini applications library 254, a voice library 255, a physics library 256, an Artificial Intelligence (AI) library 257, a music library 258, a vendor library 259, a thematic application/publication/game content library 260, drivers 261, a thematic application/publication/game state component 262, a networking interface 263, and a thematic application/publishing/game logic and scripting component 264.

The translation library 252, the film/video library 253, mini applications library 254, and a voice library 255, are all related to the engines and/or services associated with the libraries that support both a client 101, such as a client-server, or server-based 120 model. In one example, the program 110 runs from a client 101 only, which can be connected to a server 120, but in most cases is limited to the client 101. In one example, the translation library 252 will include program code that will allow the translation of one language into a different language—for example, Chinese to English. The information or data of the translations will be stored or can be located in the Thematic Application/Publishing/Game Content library 260.

The Film/Video library 253 includes programming code that will allow the present system to re-create and maintain the attributes of a number of film strips or video in its appropriate format using the appropriate code or language(s). The Film/Video library 253 may interact with the GUI 200 and Vendor Library 259, and possibly the QIE 203 and/or the Graphics library 251 for processing and display through the appropriate drivers 261 to the screen 102. The information or data may be stored or can be located in the Thematic Application/Publishing/Game Content library 260.

The mini-applications library 254 will include programming code to create the appropriate application selected by the user. The mini-applications library 254 may interact with the GUI 200, Vendor Library 259, and the Graphics library 251 for processing, and possibly the QIE 203 and/or the Graphics library 251 for processing and display through the appropriate drivers 261 to the screen 102. The information or data may be stored or can be located in the Thematic Application/Publishing/Game Content library 260. The amount of information is determined based on the set of instructions, programming code, etc.

The Voice library 255 or audio will allow for the programming, and/or generation of the audio particular to a frame or to the 2D/3D images. The Voice library 255 will interact with the GUI 200, Vendor Library 259 and possibly the QIE 203 and/or the Graphics library 251, and the appropriate drivers 261 will process the information for output. Voice is also used in this sense to take information via a microphone 104 or some type of input device 104 into the system, which is processed through the GUI 200, passed to the QIE 203 for processing and/or to the Voice library 255 for instruction to be passed back to the Graphics library 251 and back through the GUI 200 and drivers 261 to be outputted through a set of speakers or output device. The information or data will be stored or can be located in the Thematic Application/Publishing/Game Content library 260.

The Music engine/library 258 maintains the specifications for the music, music state, and all the properties, data, logic, and rules and programming that are associated with the integration and output of music in the thematic applications. The Music library 258 will allow for the programming, and/or generation of music particular to a frame or to the 2D/3D images. The Music library 258 may interact with the GUI 200, Vendor Library 259, drivers 261, and possibly the QIE 203, and/or the Graphics library 251. After the Music library 258 finds the appropriate piece of music, the program will transfer the data back to the GUI 200 and Drivers 261, to an output device or set of speakers. The information or data will be stored or can be located in the Thematic Application/Publishing/Game Content library 260, or can be pulled from a satellite transmission via the satellite service system 210. The Music engine 258 may release the memory 109 used upon completion of its task.

Each of the libraries—Translation 252, Film/Video 253, Mini Applications 254, Voice 255, Music 258, and Vendor 259, may obtain the appropriate information for data, voice, music etc., from the storage area 205 or disk and/or the Thematic Application/Publication/Game content 260, and may maintain all the information for the profiling, "game" state, and business information and tracking, by accessing the Thematic Application/Publication/Game state component 262, and by connecting to the Thematic Application/Publishing/Game Logic and Scripting component 264. The libraries will process the information, voice, data, music, etc., as appropriate or through the QIE 203, for display on the screen 102 or throughput to the digital devices speaker or speaker system, utilizing the drivers 261 and networking interface(s) 263. This option allows the user the use of the thematic application directly on his/her digital device 101 without connecting to the internet 220.

The physics engine of the physics component/library 256 controls the behavior of objects as they would be affected by various laws of nature. The physics engine of the physics component/library 256 provides mathematical manipulation to objects as to how they would react to gravity, rapid deceleration, and chaotic behaviors. The physics engine of the physics component/library 256 may inform the Thematic Application/Publishing/Game Logic & Scripting component 264 when the object should be changed given the current set of physics logic. The physics engine component/library 256 may interact directly with the Thematic Application/Publishing/Game Logic & Scripting component 264.

The physics engine component/library 256 controls releasing memory, relates physics objects to game objects, provides physics object duplication, maintains the physics object state, and provides data on object modification due to equations and the Thematic Application/Publishing/Game Logic & Scripting component 264. The physics engine component/library 256 disables the local physics code when in multi-user mode and assumes those tasks. The physics engine component/library 256 may interact directly with the Thematic Application/Publishing/Game Logic & Scripting component 264 for all networked users, and also may rely on a real-time thematic database for partial and context information.

Two technologies that may be used in conjunction thereof or separately, to manipulate the data and access the data, are mirror imaging technology and holographic imaging technology. In addition, other technology language-based algorithms can be used in recalculating the content, shapes, graphics, images, music, and video (every type of media), in order that the data can be exposed, manipulated, and accessed on any device.

The Thematic Engine 201 on the client system 101 (see FIG. 5), includes all the libraries that are needed for the interactive components of the applications such as animation, graphics, artwork, overall content, web content, and utilizes the services of translation, currency, satellite transmission, video, music, and voice-over libraries, for example. In addition, the Thematic Engine 201 contains the profile of the active users, their current states, individual histories, associations between other active users when in a game format (i.e., team members), and associations within the virtual world, such as with non-game characters.

In addition, the Thematic Engine 201 is designed for vendors in order to incorporate merchandise placement, video feeds, and mini-applications, web sites, e-commerce, music, voice, smell, and GPS system information into the virtual world. The Thematic Engine 201 may also be used for the development of mini-applications that are dictated by the vendor, and will allow a developer to build a simulated e-mail, spreadsheet, database, and any type of application that is vendor-based or pertains to the overall thematic application.

Figure 4:
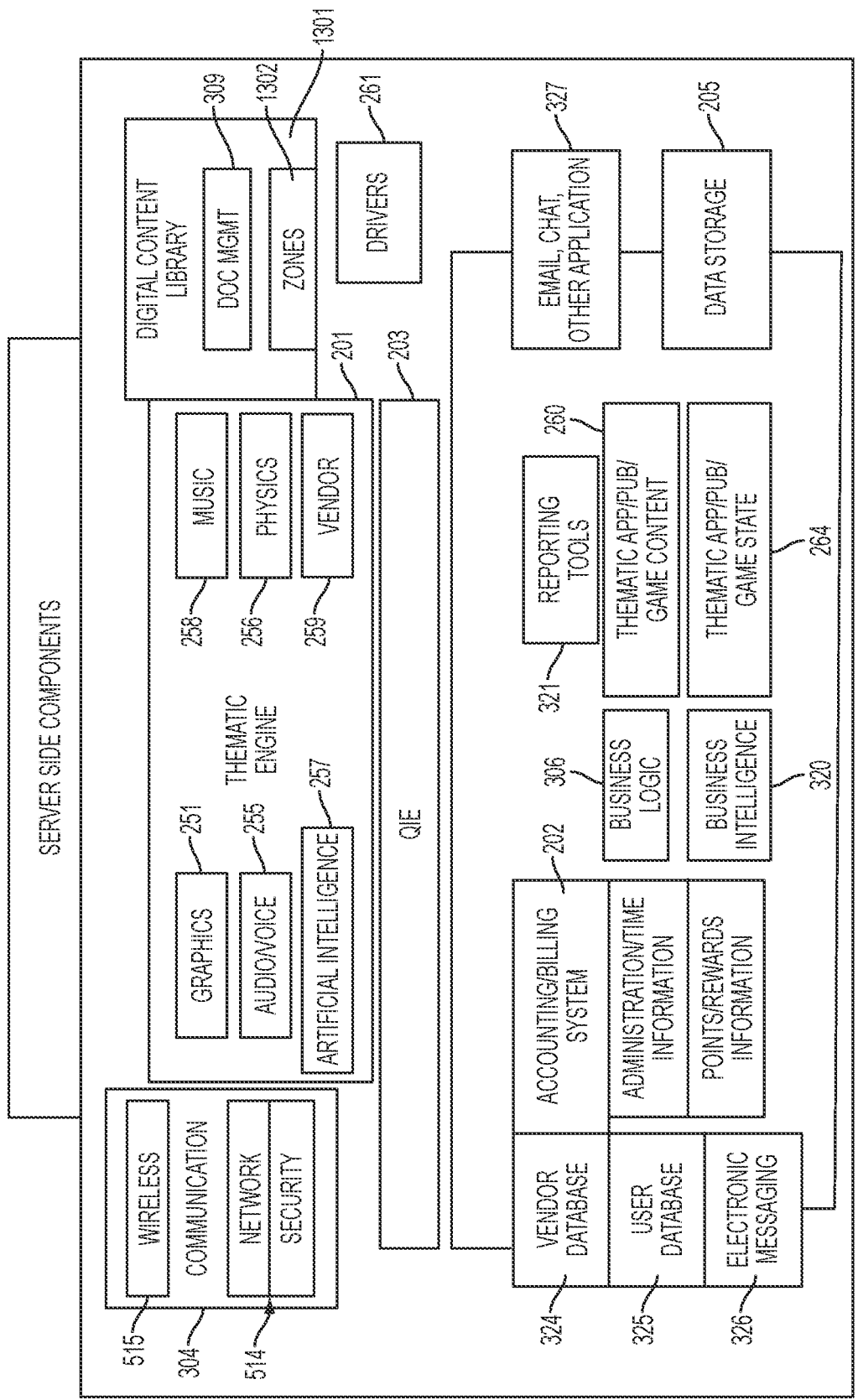
FIG. 4 is a schematic diagram of server side components, according to one embodiment consistent with the present invention.

The Thematic Engine 201 on the server system 120 (see FIG. 4) is accessed through the GUI 200, and contains the environmental game rules. The Thematic Engine 201 is the director of all previous components by working with a pre-defined (but modifiable) set of rules and events from objects, and coordinates further actions to be taken as to what will constitute the thematic environments. In particular, the Thematic Engine 201 initializes global memory structures, validation of thematic objects and engines, startup procedures for all engines, collects objects for all engines, initializes the default thematic environment, provides user information, interacts and validates the engines' status, provides access and execution to thematic environment rules, controls and creates events from engines, provides state change to all engines, provides scripting language for explicit object modification, and provides shutdown for all engines.

The Thematic Engine 201 also interacts directly with the Data Storage 205, obtaining and updating information (i.e., states, profiles and history) on the active users. The Thematic Engine 201 includes a Digital Content Library 1301 and passes information back and forth to the specific sub-folders and document management system.

The Thematic Engine 201 also ties directly into e-mail or chat systems 327 and other communications 204 applications that are necessary to the thematic applications or which may be used directly in the thematic applications. The Thematic Engine 201 will also tie directly to the Accounting/Billing system 202 for calculating the time, rewards, points, order, purchase, billing and shipping components, etc. As the Thematic Engine 201 needs information, the Thematic Engine 201 will pull that data from the Accounting/billing system 202 and its Digital Content library 1301, or the reverse, depending upon the needs of the application environment.

In a gaming environment, for example, the Thematic Engine 201 may be programmed to "grab" data/objects to be utilized in the application/game. Any objects may be also be "copied and grabbed" by maintaining the original information of the data or objects and will allow the use of that image, while maintaining the data and integrity of the object, within the application.

In one embodiment, the thematic application will accept still images and/or video feed that contains images, fashion shows, concerts, instructions, and other information that is being used within the game and or real life application. The still images and/or video feed will be transmitted through the thematic system 201 for processing. The thematic application will either incorporate the still images and/or video feed directly into the application/game zone, store it in the digital content library 1301 or a temporary location for further instruction and processing. If the images are not in the correct format, they will be transmitted to the QIE 203 engine for further processing and rendering. The format of the video can be either in a singular format or if multiple images and/or videos are to be viewed, may be shaped in any way for example a carousel, pyramid, square, or some type of form designed by the game designer that will display each image to be selected by the user for viewing. The user will have the option of viewing, purchasing or "clicking" on or off the image to go to the next area of interest. The user also has the option of exiting the game or (real-life) application to an external web site dedicated to the vendor for further information as well as purchasing additional goods or services. Upon completion, the user will be returned back to the application/game to continue from the point that they exited.

The Thematic Engine 201 may provide a storage facility for all thematic content required in the virtual environment. Objects may include video, audio, images, rule sets and default values for all objects used in the thematic environment. The Thematic Application/Publishing/Game Content component 260 may also provide multiple methods for accessing the objects and maintains a record of where objects are located. Other tasks may include providing caching of commonly used objects and a method to update objects.

The Thematic Application/Publishing/Game Content component 260 may control releasing memory, initialize data access protocols, provide access to objects on local hardware and remote hardware, caching services, compression services, versioning services, updating of objects, error checking, a framework for sub-AI engines, and error handling.

The Thematic Application/Publishing/Game Content component 260 may interact directly with the client-side server Thematic Application/Publishing/Game Logic and Scripting component 264, the graphics component 251, AI component 257, as well as the Network Interface 263.

The server drivers 261 are instructions, connections, or translations that allow the input or output of data to be recognized by certain hardware for example a screen 102, phone 101, microphone, keyboard, pen, the Internet 220 etc.

The server Thematic Application/Publishing/Game state component 260 maintains the state or information of the virtual environment. For example, in a gaming environment, if the character moves to the right and stops, the Thematic Application/Publishing/Game state component 260 tracks the actual movements of what it took to make that character move and stop. If the object is transformed to a different object, the component 260 tracks the steps that it took for that image to be transposed. The Thematic Application/Publishing/Game state component 260 will maintain the exact location of where the thematic application is stopped, such that the user can return to this same spot upon the user's return to the thematic application. The Thematic Application/Publishing/Game state component 260 also maintains the imaging, data, music, voice, film, etc. for that location. However, the content may indeed change depending upon other users/players/etc., and/or the update of information that has been added to or removed from the main system or the server 120. Although the user may be able to return to the same location and begin again, the program 110 may change the quests, questions, object(s), stores, merchandise placement etc.

The Thematic Engine 201 may be written in C, C++, C#, Java™, Python™ Curl™ and/or Assembler, or any another language that is suited for this type of interaction and/or libraries.

The Digital Content Library 1301 of the Thematic Engine 201, ties into the QIE 203 engine. The Digital Content Library 1301 is a content management application or database of the Thematic Engine 201, that will be laid out into sections or subsets and its own respective groups similar to a filing cabinet (i.e., document management system 309). The Thematic Engine 201 also contains Data Zones 1302 (see FIG. 11), which are laid out in sections and subsets as well, including for example, Zone 1: USA, Zone 1A: New York, Zone 1A1: New York City, etc.). Within each zone are a subset of data and another subset of data. Each will include, for example, the layout of the streets, buildings, stores, historic locations, rivers, streams, oceans, etc. It will also include the video, music, GPS information, and images relating to each city.

The Digital Content library 1301 includes all information such as data, codes, binary files, web content, event notification, and other information. The Digital Content library 1301 may also include scheduling directions for when the web site access and identification of where to place the web content or advertising, e-commerce, video, etc. are to be placed.

The Accounting/Billing system 202 is tied into the Thematic Engine 201 and the Data Storage 205. The Accounting/Billing system 202 is made up of several modules, which are directed to: accounting (i.e., purchasing, ordering, billing, shipping, and payment processing) for both the vendors and users, including all user information accumulated within the application (i.e., rewards, points, time (based on time zones), stopwatch or timer); creating/maintaining user profile information; a transaction database which tracks business intelligence data, licensing, rewards, points, time, and user info; maintaining a vendor database 324 of business information; a user database 325 (i.e., order configuration, encryption & compression, library data); electronic messaging 326 (i.e., e-mail, chat, or other applications); and interacts with a Business Intelligence service module 320.

The Accounting/Billing system 202, as well as the QIE 203, maintains the profiles of the active users, their current states, individual histories, associations between active users (i.e., team members), and associations with non-users (i.e., characters within the thematic virtual world). The Accounting/Billing system 202 interacts with the Thematic Engine 201 as well as the other layers on an as-needed basis to update the profiling for the thematic applications, as well as information needed for business intelligence reporting.

The Accounting/Billing system 202 gathers business intelligence data, supplying the information to the user or the vendor in real-time, offering all of the latest data which is tracked within the applications. The Accounting/Billing system 202 interacts with the vendor database 325, providing relevant information (i.e., raw data, canned reports, etc.) to the vendor on the active user's consumer behaviors, including likes, dislikes, purchases, etc. Maintenance fees for upgrades and updates are automatically sent to the vendors.

The Accounting/Billing system 202 interacts with the Data Storage 205 to update information on the active users, determining what information is relevant today vs. yesterday. The Accounting/Billing system 202 ties back into the Thematic Engine 201 and then to the Data Zones 1302, as well as the application builder and interpreter (QIE engine 203).

The Accounting/Billing system 202 includes the rule-based component of business processes for e-commerce, such as advertising, billing, profiling, etc., and integrates easily with all the networked components, libraries, QIE 203, and business intelligence. The rules are developed using Java, C, C++, Python™, Curl™ or any other programming language. It includes XML, HTML or any markup language or other method for communication to connect and communicate with the internet and it will be extensible. The Accounting/billing system 202 handles the translation of rules to and from heterogeneous commercially important rule systems/languages, as well as to and from the existing components and external services performing actions and testing conditions, and maintains the status of the entire QIE 203 environment and keeps its services supported. The Accounting/billing system 202 includes intelligent agents for the following: e-commerce, procurement, catalogs, storefronts, auction, configuration, financial—billing and shipping, connecting to the services etc.

The Business Logic 306 interacts with the Business Intelligence service module 320 for business intelligence data, supplying the information to the vendor in real time offering all of the latest data which is tracked within the applications. The Business Logic 306 component interacts with the vendor, providing relevant information (i.e., raw data, canned reports, etc.) to the vendor on the active user's consumer behaviors, including likes, dislikes, purchases, etc. Maintenance fees for upgrades and updates are automatically sent to the sponsors.

The Business Logic 306 interacts with the Data Storage 205 to update information on the active users, determining what information is relevant today vs. yesterday. The Business Logic 306 ties back into the Thematic Engine 201 and then to the zone application builder and interpreter (QIE engine 203).

The Business Logic 306 is written in C, C++, C#, Java™, Python™, Curl™ and/or Assembler, or any other type of language appropriate to achieve the above-described features.

The logical architecture of the present invention is designed to provide future consideration for APIs at the Thematic Engine 201 and Accounting/Billing system 202 components. Using software development kits (SDKs), corporate sponsors using professional services, are able to make customer modifications to the thematic application or game.

The Data Storage 205 includes distributed databases containing all relevant information on the active user's profile in their current state, history, and real world content. The Data Storage 205 interacts directly with the Thematic Engine 201 and the Accounting/Billing system 202. The database tables will be distributed using an appropriate database application that will support grid-based logical architecture or other appropriate database architecture.

According to one embodiment of the invention, the data storage device 205 may store at least one data file, such as image files, text files, data files, audio files, video files, among other file types. According to one embodiment of the invention, the data storage device 205 may include a database, such as a centralized database and/or a distributed database that are connected via a network 220. According to one embodiment of the invention, the databases may be computer searchable databases. According to one embodiment of the invention, the databases may be relational databases. The data storage device 205 may be coupled to the server 120 and/or the client computer 101, either directly or indirectly through a communication network 220, such as a LAN, WAN, and/or other networks. The data storage device 205 may be an internal storage device 113. According to one embodiment of the invention, the system may include an external data storage device 114. According to one embodiment of the invention, data may be received via a network 220 and directly processed.

The Communications 204 of the server 120 system (see also FIG. 5) can handle a multiplayer network and will use standard internet communications that tie into existing libraries or with custom modifications.

The client Communications 204 interface (see FIG. 5) provides access to various network services required to interact with other users (such as a messaging service, system administration service, user/group administration service, chat service, thematic state tracking, and character profile service), and controls dynamic features as applied by the central servers. The client Communications 204 may provide alternate connection options, and controls termination of the connections.

The server Communications Network/Security interface 514, addresses the security of the logical architecture at two levels. The integrity of the active user is maintained, and secure interaction between the system of the present invention and the vendor is maintained.

The server Communications interface 514 provides access to various network services required to interact with other users and control dynamic features as applied by the central servers. The server Communications interface 514 may include maintaining the state of the thematic environment amongst various users, providing anti-cheating and anti-theft mechanisms, providing messaging services between users, and passes information to and from the client 101 applications and other internal server 120 side applications.

The server Communications interface 514 may require interaction with the server Accounting/Billing system 202. The server Communications interface may also require access to other client software during use, and direct access to various databases' information for performance reasons.

The server Communications 204 provides security functions such as user authentication and anti-cheat, anti-theft algorithms, and may also provide methods for secure billing and rewarding systems to users with audit functions. Security is maintained within the virtual environment to ensure that users adhere to virtual world rules. The server Communications 204 prevents hackers from accessing, modifying, or corrupting data (i.e., modifying their current state and history or the data of others), thus preventing sabotage for the active user population.

Security is also incorporated using encryption between the Accounting/Billing system 202 and the vendors to ensure that there is no back-door entry into the vendors' websites, nor proprietary consumer data is intercepted.

With respect to the service modules, these modules are state-of-the art systems which are conventionally available.

The server side AI engine 257 interacts directly with the Thematic Engine 201. The AI engine 257 controls the behavior of objects that exhibit intelligence beyond that of the user's or the thematic environment on the network. The AI 257 may be used to manipulate objects, for example, such as NPCs (non-player characters) when in a thematic/gaming context, animal characters in thematic environments, and simple games within the game. The AI 257 informs the Thematic Engine 201 when the object should be changed given the current set of AI logic. The AI engine 257 disables local AI code when in multi-user mode, and assumes those tasks. The AI engine 257 may also rely on the real-time thematic database for spatial and contextual information.

The AI engine 257 provide AI object duplication, relates AI objects to thematic environment objects, maintains the AI object state, provides data on object modification due to AI rules and thematic logic, provides secure transport of data to/from clients 101 and servers 120, receives data from the server 120, if provided, checks for errors in data, collects thematic environment state information from the client 101, and makes thematic environment state information available to the Thematic Engine 201, provides messaging services, and real-time file loading services.

The Vendor library 324 maintains the specifications for the vendor's product placement, display, storefronts, and all the properties, data, logic, and rules and programming that are associated with the integration and output of the vendor components or 2D/3D images in the thematic applications. The vendor library 324 may interact directly with the Thematic Engine 201, the GUI 200, the Accounting/Billing system 202, drivers 261, and the QIE 203. The data may be stored in the data storage 205, digital content library 1301, or pulled from a satellite transmission via the satellite service module 210. It will tie directly into the Thematic Engine 201, and will release the memory used upon completion of its task.

The server Networking Interface 514 provides access to various network services required to support the server 120, such as a messaging framework, etc., and includes maintaining the server component framework. The server Networking Interface 514 is responsible for extracting in real-time, real world information and normalizing it for the thematic environment. Data sources may consist of XML, SOAP, HTML, FTP, Telnet, or any other commonly available method of data transfer. Normalized rule sets are sent to the server Thematic Application/Publishing/Game Logic and Scripting component 260 for implementation in the thematic environment. The real world Networking Interface 514 is also responsible for maintaining rules that affect the thematic environment when no other real world data is available.

The server Thematic Application/Publishing/Game Logic and Scripting component 264 takes data from a rule set as well as from external sources and modifies the thematic environment. Rules may be static and retrieved from a data source, or they may be dynamically created from an application tool. External rules will come from various sources and will arrive in moralized manner. All real time modifications to the thematic environment may be routed through the Thematic Application/Publishing/Game Logic and Scripting component 264.

Although the above physical architecture has been described above as client-side or server-side components, one of ordinary skill in the art would know that the above components of the physical architecture may be in either client 101 or server 120, or in a distributed environment.

Further, although the above-described features and processing operations may be realized by dedicated hardware, or may be realized as programs including code instructions executed on data processing units, it is further possible that parts of the above sequence of operations are carried out in hardware, whereas other of the above processing operations are carried out using software.

Further, although aspects of one implementation of the present invention are described as being stored in memory, one of ordinary skill in the art will appreciate that all or part of the methods and systems consistent with the present invention may be stored on or read from other computer-readable media, such as secondary storage devices, like hard disks, floppy disks, CD-ROM, or other forms of ROM or RAM either currently known or later developed. Further, although specific components of the system have been described, one skilled in the art will appreciate that the system suitable for use with the methods and systems consistent with the present invention, may contain additional or different components.

The present invention is implemented in software which can be provided in a client 101, client 101 and server 120 environment, or in a distributed system over a computerized network 220 (the physical architecture is described below), or embedded in a controller that activates both the computer system and/or other devices.

Additional services are a subset of the Business Logic module 306, and include e-mail, chat, order entry, purchasing, billing, and vendor fulfillment modules.

The virtual platform of the present invention may use the support of PCs, or any other type of hardware that can support specific tasks at the Business Logec 306, Accounting/Billing system 202 and Thematic Engine 201. This may take the form of Grid, Artificial Intelligence (AI), or other technology advanced servers, or the entire system may be hosted on a very high level supercomputing system that can calculate very complicated algorithms and manage all processes supporting well over millions of users simultaneously.

In particular, the present invention may be used in a client-server context, or may be a distributed system across a number of client systems 101. Thus, in the present invention, a particular operation may be performed either at the client 101 or the server 120, at the edge of a network or at the center, or both. Therefore, at either the client 101 or the server 120, or both, corresponding programs for a desired operation/service are available.

In a client-server environment, at least one client 101 and at least one server 120 are each connected to a network 220 such as a Local Area Network (LAN), Wide Area Network (WAN), and/or the Internet, over a communication link. The steps in the methods consistent with the present invention are carried out at the client 101 or at the server 120, or at both, the server 120 (if used) being accessible by the client 101 over for example, the Internet using a browser application or the like.

Note that at times the system of the present invention is described as performing a certain function. However, one of ordinary skill in the art would know that the program is what is performing the function rather than the entity of the system itself.

The physical architecture of the present invention may include at least one co-located hosting site having racks containing server hardware blades running operation systems, and other necessary applications. The present application's co-located hosting sites may be deployed at two additional locations, providing full geographic diversity. These sites may be near major private or public peering points. The server hardware blades may be connected to storage devices using network attached storage (NAS); but could also be a combination of local disks and a Storage Area Network (SAN), and redundant Gig-E connectivity. The racks may be connected to the co-location hosting providers' switches providing direct connectivity to the Internet or contained in a single location. The present application co-location site may be fully redundant with multiple egress paths to the Internet. Interaction with the vendors and active users may be through secure and non-secure internet connectivity.

If there are separate administrative servers 120 for billing and general customer care, they may be maintained in physically separate locations from the main servers 120.

The underlying technology allows for replication to various other sites. Each new site can maintain "state" with its neighbors so that in the event of a catastrophic failure, other server systems 120 can continue to keep the application running, and allow the system to load-balance the application geographically as required.

DESCRIPTION OF THE INVENTION

The present invention is directed to an apparatus and method for conducting a transaction—such as the purchase of goods and services—including the collection, conversion, storage, tagging, and the integration of a live inventory system, mark-up, mark-down system, finding store location(s), live auction, and bartering system in an interactive software application, virtual world, social network, commercial and/or game application, which provides a real world experience to the user.

The present invention may be used in merchandising, entertainment, business, publishing, and other applications to provide a virtual and real world experience to the user by integrating audio, video, 2D and 3D technology, and other technologies that may enhance the user's experience. In particular, the program of the present invention injects real-time data, such as pricing, film, music, news, etc., into a virtual thematic environment which includes both audio and video, and also integrates mini-applications, such as word processing, banking, spreadsheets, purchasing (i.e., e-commerce applications, and any other type of application that can be scaled or as a demo), e-mail, and the like, into the virtual thematic environment, without a noticeable delay. The present system can be both a rich graphic environment, and may also include a holographic system and technology, mirror imaging technology, and high-level algorithms. The present invention can provide a virtual 2D and/or 3D environment, which can include not just audio, music and video, but sensitivity to touch, the sensing of odors etc., so that the user can experience a real world environment in which the user can move through in real-time.

In particular, in one embodiment, the system of the present invention may be used to provide the user with, for example, a selection of merchandise for purchase. To create an inventory selection for the user, images are captured by a third party or third party vendor, and uploaded into an inventory system which is stored in data storage 205 of a dedicated computer system 101, 120. Captured images are converted by the program 110 of the present invention, in an application environment, and catalogued into a database 205, content management system or a library 1301, for future use.

Specifically, a third party or third party vendor will use their own imaging capture equipment 104/600 (see FIG. 6) to capture the images of the merchandise, process and rasterize the images into the proper format, and either maintain them in their own inventory system for ticketing, and/or transferring the files to a tagging engine 1305 (see FIG. 11) for tagging for the application/game for use.

In one embodiment consistent with the present invention, a method of receiving information, data, images, may be from a satellite system 210, video, inventory or image application, database, computer 101, 120, cell phone, camera, video camera or any type of input device 104/600 transferred directly to digital content library 1301, data storage 205, memory, thematic environment, or communication device.

The input devices 600 used by the third party or third party vendor, may be either set up in a constant state of capture on their own (i.e., fixed camera), or hand-held by the user (i.e., cell phone camera). Depending upon the type and configuration of the imaging capture device 600, it may continually rotate and capture images, capture images directly, or may be a point-and-click type of device. The imaging capture devices 600 can be obtained in different configurations based on the manufacturer.

Figure 7:
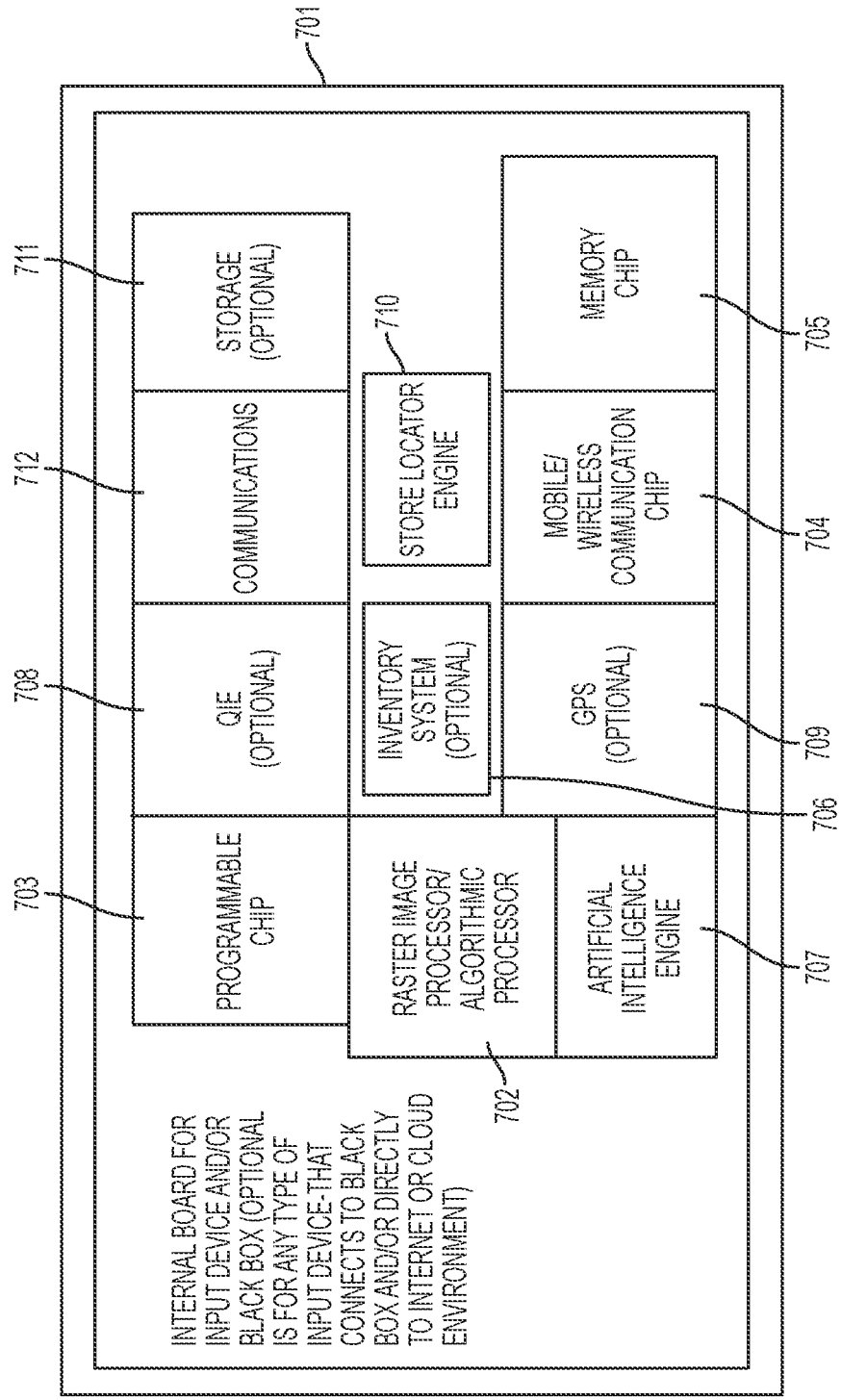
FIG. 7 is a schematic diagram of an Internal Board for an Input Device and/or Black Box, according to one embodiment consistent with the present invention.

The third party or user could use an input/camera device 600 that is either 2D, 3D, a combination thereof, and have an embedded controller 701 (see FIG. 7) with the proper processors (i.e., raster image processor/algorithmic processor 702), programmable chip 703, memory chip 705, artificial intelligence (AI) engine 707, store locator engine 710 (discussed below), communication devices (i.e., communications 712, mobile/wireless communications chip 704), within the actual input device 600, which include its own set of controllers, processors, memory and software, or which can be connected directly to the application/game engine environment either via wireless, wires, or some other form of communication. The embedded controller 701 may also include its own QIE 708, GPS 709, and data storage 711.

The owner (user, third party, third party vendor) of the input device/camera 600 determines what he/she selects based on the configuration of the input device 600, which depends upon the type of control the user, third party or third party vendor wants over the merchandise (i.e., they may either maintain their own inventory system 706, or provide the images to a dedicated inventory system 1200 (see FIG. 12) for direct management).

Thus, the user or a third party or third party vendor (may be an authorized vendor), or a visitor, logs into the dedicated main computer system 101 of the present invention, by entering their name and password on the website. The user or consumer logs into the system via an input device 104, for example a mobile phone or tablet etc., and sets up the input device 104 to receive instructions and information from the system over the internet or cloud environment 220.

The user also sets up the system of the present invention from the input device 104 (i.e., mobile phone, PC, for example), to accept and process the data it receives.

If the person logging in is an authorized vendor, they log into the vendor section to input or download their images and inventory files for storage, game play, sale etc. The vendor determines if they are going to provide the inventory directly to the dedicated inventory storage 1200 or if they will manage the inventory themselves. The inventory and images are populated by the program 110, to one or several e-commerce sites and/or to the dedicated inventory system 1200. Thus, depending upon who logs into the system, the user or third party or third party vendor decides what they are going to do and if they are going to manage their own inventory.

Figure 8:
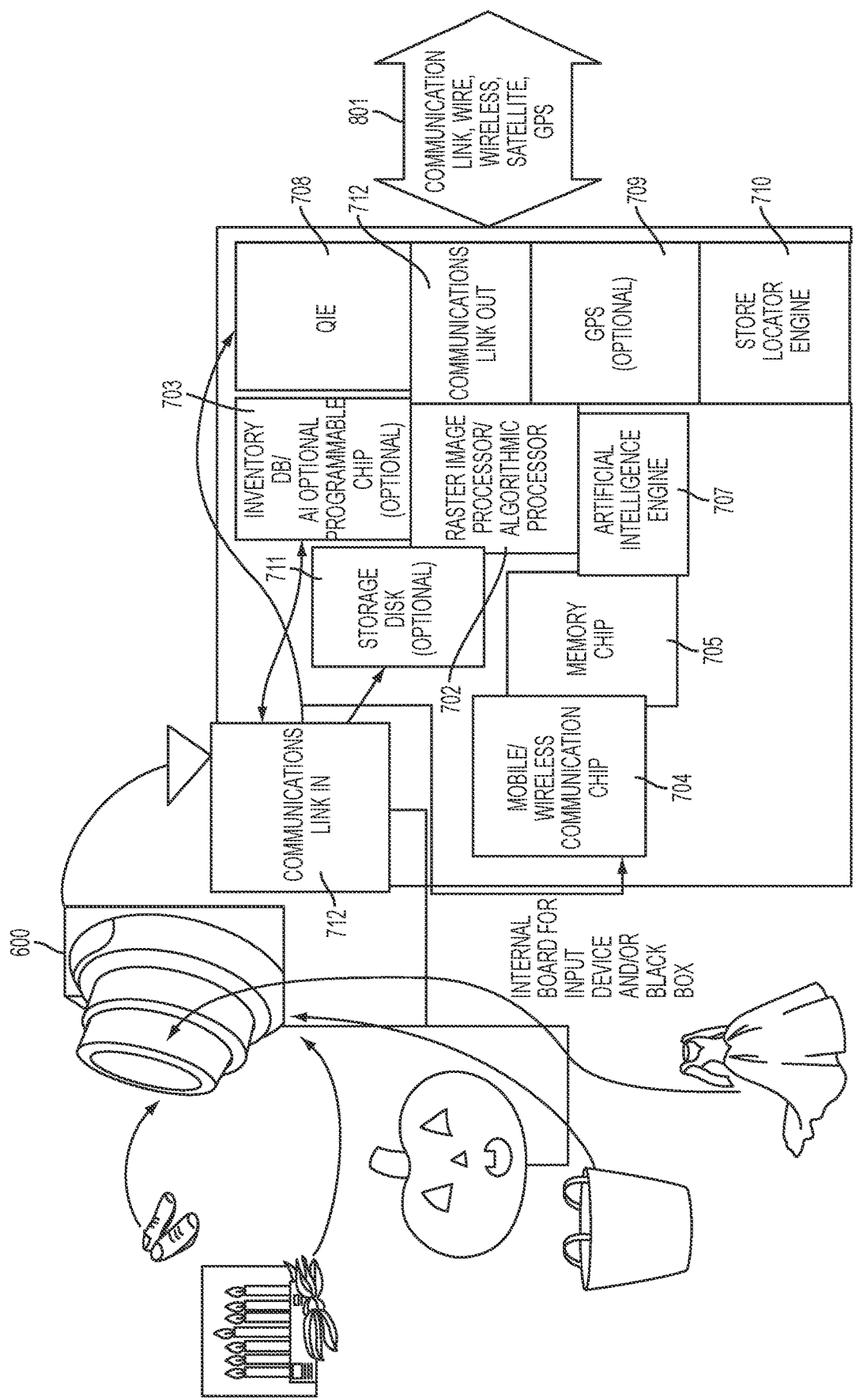
FIG. 8 is a schematic diagram of an input device which captures and processes images, according to one embodiment consistent with the present invention.
Figure 9:
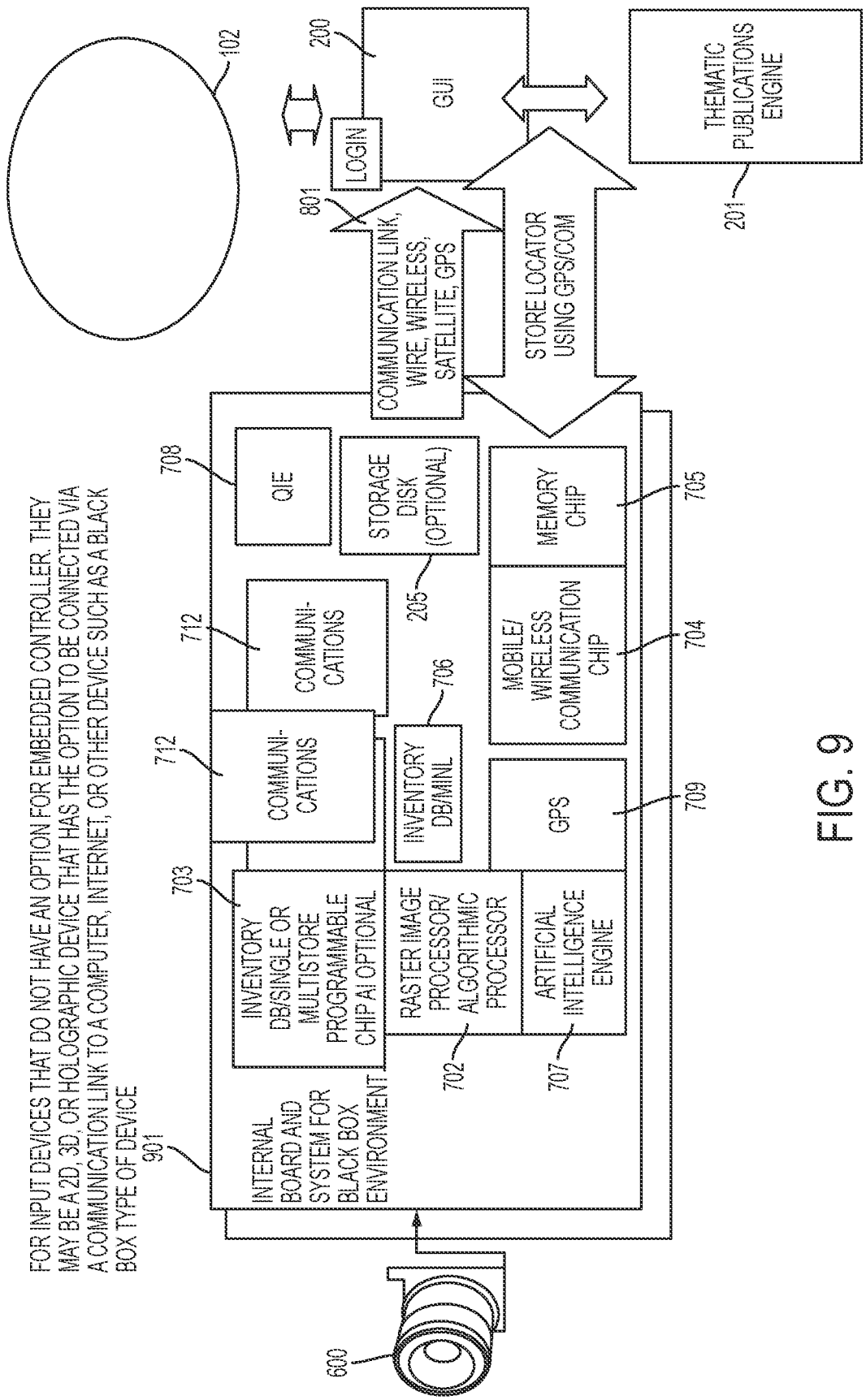
FIG. 9 is a schematic diagram of a Controller board for a Black Box for input devices that do not have an option for embedded controller, according to one embodiment consistent with the present invention.
Figure 10:
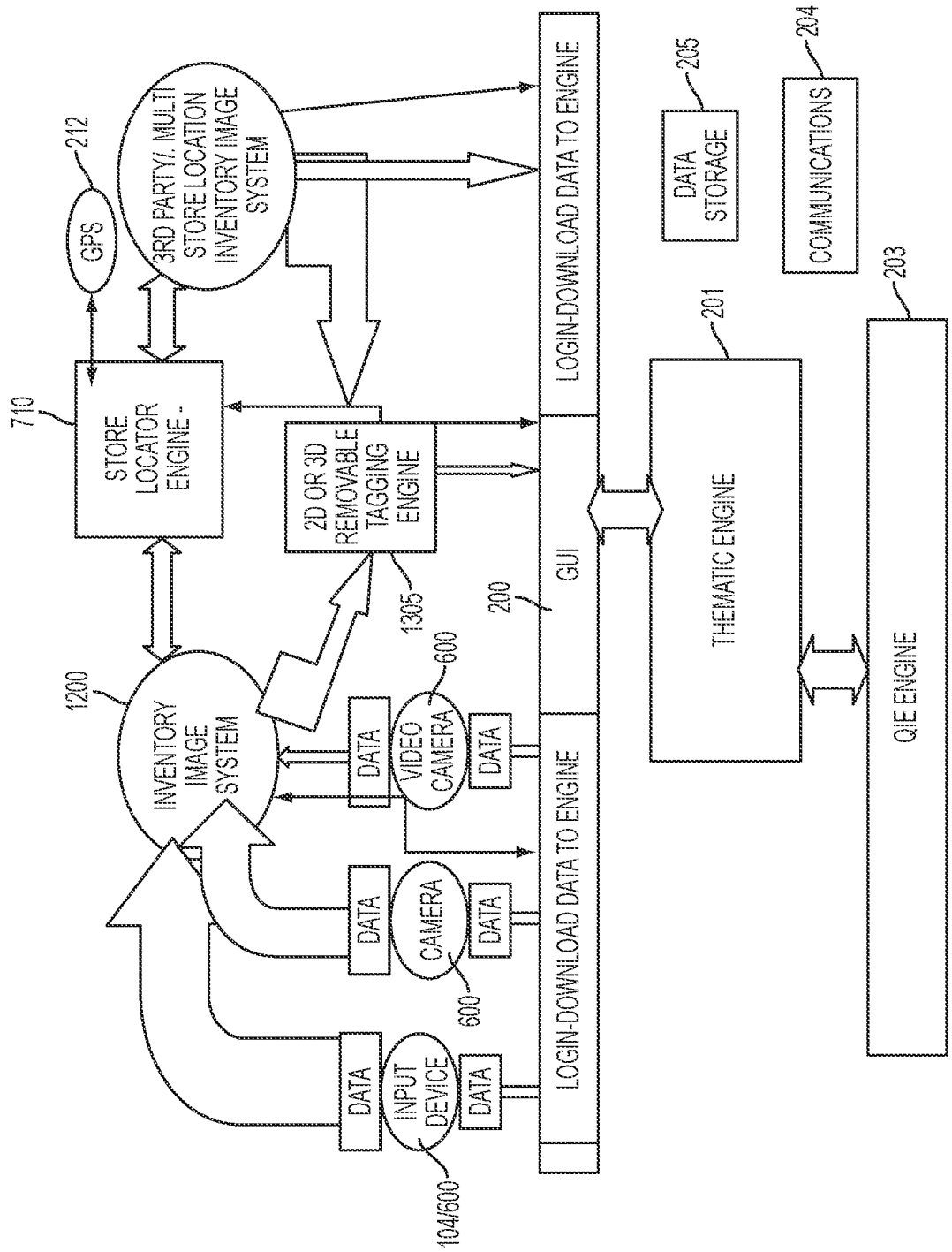
FIG. 10 is schematic diagram showing how captured images are taken and transferred to either an inventory system for ticketing and then to a tagging system, or directly to the processing engine for storage, processing or both, according to one embodiment consistent with the present invention.

Specifically, the image capture and data transfer system operates as follows. The user, third party, or third party vendor captures the image using the input/camera device 600, and transfers the image files via a communication link 801 (see FIG. 8) that could be a wired component from the image capture device 600 to the main dedicated system (using a controller board 701 embedded in the input device 600), or transfers information to a black box 901 (see FIG. 9) containing controller devices (see FIG. 7), or via a wireless component, all of which transfer the images to the system via communication link 801 for further processing and communication to the user on a display 102 device.

The data (images) inputted may be transferred to storage such as a storage device 205, or to memory 119, or database 113, 114, by the program 110. Based upon the settings inputted previously by the user, third party, or third party vendor, on the input device 104 or the main system, the program 110 instructs the AI engine 707 to process the data or information in a number of ways. The program 110 may send the data to an inventory system 706 internal to the input device 104, to an inventory 1200 on a server 120, or directly to the inventory stored on a main computer system 101 in data storage 205, both accessed over the internet or cloud environment 220.

The captured images will automatically be embedded by the program 110 with a description set that includes: device serial number, vendor identification (ID) and/or any type of unique ID differentiating it from other images captured. The serial number is programmed in the input device 104—i.e., camera 600—during manufacturing and assembly. When the input device/camera 600 is in use, the program 110 will activate the device 600 to embed the serial number which will be added to every image captured. The vendor ID is created by the individual who owns the input device 104 by configuring the camera 600 to include their information during setup. This information will include the name and a business ID if they have one, or other identifying information. The program 110 transmits the ID information in a readable form to either a programmable chip 703 or a set that is found on a motherboard in the input device 600, by sending a signal to the main inventory system 1200 at a different location, via GPS, satellite, cable connection, or some type of hybrid connection, etc. The board 701 has a minimum of one programmable chip 703 and may include other programmable chip(s), a communication chip 712 and wires, or wires/cable that connect directly to and communicates to either a black box 901, internet 220, mini-inventory system 706 on the input device 600, which then connects directly to a main registration system, or cloud based inventory system 1200 at a different location, that connects to the application and/or game for use. The information will be checked by the software program 110 against the input device's 104 inventory system 1200 that is located on the separate system environment 1200 (i.e., client 101, server 120, etc.), over a communication link 801 (i.e., via internet, satellite, etc.).

The ID that is embedded onto the image is non-removable, invisible to the naked eye, and cannot be changed by the user. The description set is created in a format that can be embedded onto the image when the file is stored in memory 109, hard disk 711, storage mechanism 205, or prior to being transferred. The input device 104 will have a programmable chip 703, board 701, or other hardware component that has logic to understand that an image is being captured.

The software program 110 will check the environment on the local device 600 and then against the systems from a different device and/or at a different location via a communication link 801 to the main system 120, either located on the internet, in a cloud environment 220 or a mini system, etc. The program 110 polls the information on the devices 600 and matches them to the main system 120 to determine if there are any duplicate input devices 104, i.e., duplicate information of when the camera 600 information was registered for first time use. If the program 110 determines the ID is a duplicate, the program 110 will forward a number or ID that is not in the system, to the user, and request the user to accept or decline. If the ID number is not a duplicate, the program 110 automatically embeds the ID onto the image.

The program 110 will then determine if the data should be formatted. (This is performed by the AI engine 707 transferring instructions to the QIE engine 708 for formatting, which communicates with the algorithmic processor 702 to determine which algorithms to use). The program 110 can then instruct the GPS 709 to display where the merchandise is located in the virtual environment, whether to store the image locally in memory 705, database 711, or external storage 114, and to pass on the data to the main computer system 120 for further processing via the output communications link/device/processor or a wireless component 801 that communicates with the main system 120.

The images are converted in the following manner. They are captured by the input device 104, and the information is sent to the artificial intelligence (AI) engine 707 to process and determine what has to be done to the image. The image is then run through the quantum imaging environment (QIE) engine 708 that is connected to an algorithmic chip 702 for number "crunching" the correct algorithm that is associated with the file type to be created. Depending upon the configuration of the board 701 and if the device 600 has a board located within the device or not, the AI engine 707 will determine if the image is to be tagged via an inventory system 706 that is located on the board 701, or if it should be sent to the main system 120 for tagging. In either case the image may be stored in memory 705 until the AI engine 707 instructs the file to either be transferred, reviewed against the main inventory system 120 for duplicate information, submitted to the main inventory system 1200 or sent directly to the thematic engine 201 for processing.

Figure 6:
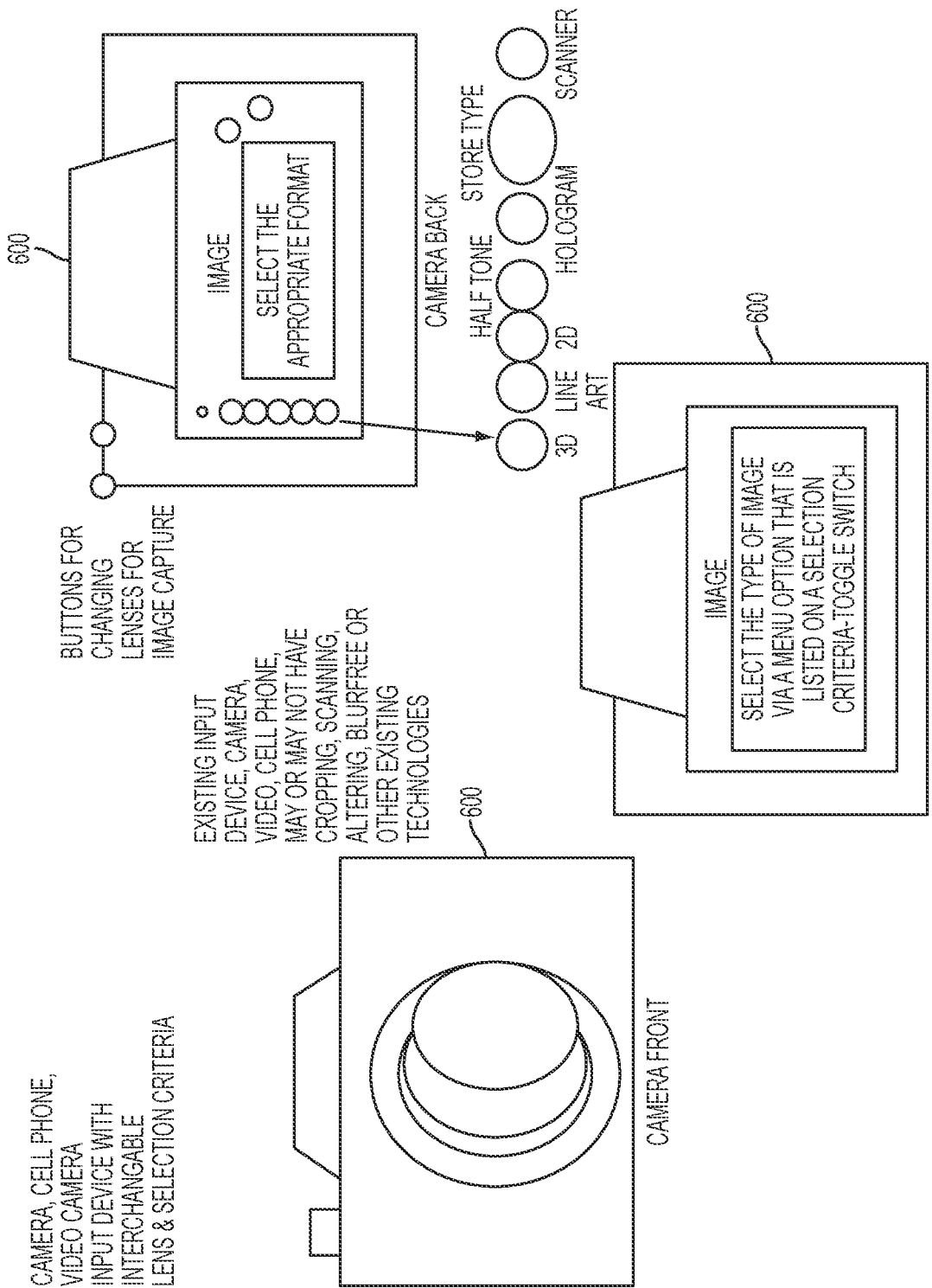
FIG. 6 is a schematic diagram of a camera with removable lenses or configurable lenses, according to one embodiment consistent with the present invention.

In another embodiment of the system, the images will be converted to line art, halftone, hologram, or 3D image based on the setting selected on the input device 104 (see FIG. 6). In some cases the user may select ALL for all settings, ONE for one setting, TWO for two settings, or THREE for three settings, etc. In other cases they may have only 1, 2, 3, or all four selections but may be able to pick one option only or some combination thereof. The selections can be done on the camera 600, in an instruction unit on the camera 600 that communicates with the black box 901, on their computer/input system 104 (cell phone, laptop, terminal, display or any type of system that allows for this selection input), or selected from any input device 104 that allows the user to make a selection either verbally or through touch.

In yet another embodiment the merchandise may be in a line art form or form that has been designed for game play. The individual at any time may pick up the image, "click" on and view the actual article, use a key on the keyboard to select the merchandise, use voice activation, point and "click", using a mouse, or selecting a key, using a joystick etc., and convert it back to an image by turning it off the "live form" when they want to either purchase the goods or put it back, move it, carry it around the environment, etc.

Specifically, the image is tagged by the program 110 with a removable ticket inventory ID, and rendered to the correct type of image data type 2D, 3D, or hologram. Then image conversion may take place either in the input device/camera 600, black box environment 901, computer system 120, and internet or cloud environment 220. The inventory ticket or tagging may include all or some of the following: item, date, time, color, type, vendor, class, size, price and vendor id/serial number etc.; or vendor ID/serial number, service and price; or any combination. The minimum information may be the date and vendor ID/serial number. The inventory ticket is created by the ticketing engine or in a local environment that communicates to the ticket creation engine that may be consistent with a database or container.

The images can be stored in the input device 104 (camera 600, video camera 600, cell phone, or other input device 104), or in a black box 901 (i.e., storage 711), or transferred directly to the thematic environment for immediate use or transferred to the digital content library 1301, data zone 1302, temporary storage 1307, or to a ticket creation engine 1306 for those images that do not have a ticket created, but are transferred directly from the input device 104 as either rasterized in the proper format or kept in their native captured format.

In one embodiment, with respect to the images from the inventory system 1200 of either a third party or application inventory system, the program 110 tags the images automatically using a tagging engine 1305 tied to the inventory system 1200 or embeds the software within the inventory system 1200 as a component to their system. The tagging engine 1305 includes a 2D or 3D tag that identifies an e-commerce transaction, and which is removable (can be "lost" during game play) by either the user, another player or an avatar. The tagging engine 1305 produces a tag generating an ID that matches the item that has the specific identification information such as size, color, vendor, type, price, date, and inventory ID number and its unique identifying ID that was obtained during image capture. Each ID contains a unique identifying number that matches the merchandise ID and the Vendor ID that was embedded during the capture of the image. If the images do not have a unique identifying number from an inventory tracking system 1200, the program 110 will automatically generate the ID at the third party who is presenting his or her goods for sale in their assigned Zone.

Each third party must be registered and receive an ID associated with their business to create an inventory tag. In the present invention, the program 110 will assign a unique vendor or identification number in order for the individual to conduct business.

In one embodiment, the images are tagged by the program 110 after the capture of the images from a digital camera 600, video camera 600, or a device 104 that allows photographic or video input, and the images are tagged in the device 104 itself. The device 104 may contain a controller board with a tagging software engine 1305, AI 707, rendering engine, and processing chip 702. The tagging engine 1305 tags the images with a 2D or 3D removable tag assigned by the program 110. The program 110 will take into consideration the serial number of the device 104 as the unique identifier and will embed this ID within the image data. The program 110 will require that the system be configured to include the third party registered vendor information as well. The tagging software engine 1305 polls the Ticket Creation engine 1306 that is located on the internet 220 or in a cloud environment for ID duplication. If the program 110 finds that the ID is a duplicate, it will provide a unique inventory number and maintain the input systems ID and vendor ID.

In yet another embodiment, the inventory system 706 can be located in a black box 901 type of device outside of the input device 104 where the third party will be provided with a tagging number from the program 110. The black box 901 will contain a local version of the inventory system 706 for tagging, AI engine 707, rendering engine, processing chip 702, and polling software 1303. The inventory tag is attached to the image after the program 110 verifies the unique identifier, and the program 110 will use this ID on its removable tag. The inventory tag includes all the identifying information of the goods or services such as vendor, color, class, size, service, etc. The program 110 will then pass on the image to either the thematic environment for application/game play, or the thematic environment will send the information to the digital content library 1301, data zone 1302, or temporary storage 1307 to be used at another time.

The inventory system 706, 1200 includes the images that have been developed and stored in the database (i.e., digital content library 1301 or storage system 205). The inventory system 706, 1200 includes merchandise, goods, or other assets whose images were transferred from the input devices 104 by the program 110 directly to the thematic environment of the system 120 for processing. The content and inventory assets are set up by the program 110 for display by either the user's application (i.e., user's Company) or by a third party vendor supporting their own merchandise, and are presented by the program 110 for purchase, bartering, auction, paying a consignment fee, etc. Each group will have access to a mini application environment that has been developed using the thematic application environment formatting the display of the merchandise or services.

Once logged onto the system, the user selects whether to purchase or play. This selection is developed in a GUI 200 environment that communicates to the thematic application environment for further processing. The user can also select an avatar, or design or import their own. Depending upon the platform, the user may enter their information on a social network site, internet site, their own system etc. During the user's access of the system, depending upon the time zone that is communicated through the system's local environment, the application/game store may be closed to the public. However, assuming the application (i.e., department store) is available (and may be available 24 hours), the program 110 will send a notice to logged-in users and others who are registered with the system, that the application/game is up and running.

In one embodiment, the application is a store selling merchandise. Once the store is open for business, the program 110 of the thematic environment may have the customer/user avatars stand in line waiting to get in. The program 110 can display the avatars on the street, in the subway, in the doorways chatting, eating, reading etc. The display then shows the store opening, with the avatars rushing in, mice scattering, and workers moving out of the way.

The avatars (employees) the program 110 has populating the gaming/application either are, for example, roaming the product aisles, picking up/folding merchandise, dropping off merchandise, re-ticketing merchandise, or are in a training room conducting merchandise training, or are ready to train those who wish to learn merchandising. The avatars and images have been designed by the user, third party, or a third party vendor, and are sent by the program 110 to the thematic environment for processing, storage, and use.

The training engine 1304 (see FIG. 11) of the program 110 maintains the training materials, educational information, tests, and other information that pertains to training for merchandising. The training engine 1304 is connected to the thematic application and communicates to the thematic application engine 201 via an AI 707 instruction set. Within the engine 1304, written material, tests, accounting projections, what-if scenarios, videos, and live discussions may take place, as well as chat sessions. This information is stored by the program in a thematic content system database 205. Documents may be uploaded, corrected, and graded by the program 110 depending upon the training class taking place at that particular time. The training engine 1304 is also connected to a "chat" technology component, the thematic environment, digital content management, and QIE engine 203 for processing.

The program 110 then shows store avatars standing behind each of the virtual registers. The virtual registers are connected to the usual credit card, internet payment systems 1312, and include state-of-the art accounting and billing systems 202. Each avatar is located at a specific Zone which includes a predetermined type of inventory, the Zone having a register, and supervisors behind their desks. The supervisor's avatar's profile is created in the character state by the program 110 and is linked to the markdown/markup engine 1308, thematic environment engine 201, and the billing system 202. During the user's access/play, all the other avatars representing other users, enter the virtual store and rush to areas that they expect to see new merchandise, marked down merchandise, concert tickets, live auction, chat rooms, or, in one embodiment, a designated avatar for an astrological/psychic reading, for example. In fact, the areas or Zones, or vendors, that the user wishes to visit are pre-configured by the user, such that the user may select the option of which site or zone the user wishes to visit first. The selection process will be displayed to the user prior to entering the virtual environment, as to which vendor/zone the user wishes to target.

The program 110 runs the virtual environment as approximating a real-life experience, where the avatars can purchase items, return items, try on clothing, interact with other avatars to select merchandise, visit the credit office regarding increasing a credit card limit, getting copies of statements, see a concert, watch a fashion show, barter (or fight for) merchandise with other avatars, etc. The user's avatar can take the merchandise, hold onto it, carry it throughout the store, try a device, toy, etc., and get it marked down by the supervisor avatar, if the ticket has not been updated, or even hide it, among other actions. In the virtual environment (store), the merchandise will be in a form that is either 2D or 3D, that has already been processed and formatted either during the capture of the images or after transfer from the holder of the images to the thematic environment.

The program 110 will provide the virtual environment in a "department store" layout, such that, for example, sportswear is located on the first floor, electronics is located on the same floor with menswear, dresses are located on the next level, etc. Signs are posted, and store avatars may provide directions to the user by voice or text. The avatars may access other areas or zones of the site, or virtual environment, by going up and down the virtual escalator and elevators, etc.

The avatars may visit a ladies' or men's room, visit a restaurant where food items may be purchased, and then may exit the site to visit the wider virtual environment as described in U.S. patent application Ser. Nos. 10/272,408 and 13/137,299, and U.S. Pat. Nos. 7,373,377, 8,225,220, and 8,228,325. If items are taken by the user without purchase, the program 110 may have the avatar accosted by security and reminded to pay, the item returned to the store, or further sanctions may be taken against the user (i.e., banned from the store or the particular zone, etc.).

To track the merchandise in a live environment, an RFID tag or chip may be attached to the merchandise, or a bar code, metallic ink, company thread, company anti-counterfeiting dust, special inks, or GPS system, may be used to track, update, markup and markdown, price, and tag the merchandise. The tracking mechanisms are recognized either by the imaging, by scanning the merchandise using special types of scanning devices including cell phones, and other types of devices that recognize the special inks, thread, dust, bar codes or RFID tags, and which send a signal via a com port on those devices via a wireless component to the inventory engine 706 for processing. A QIE engine 203 and a communication and/or wireless chip may be embedded onto the scanning type of device sending the signal back to the inventory system to process and update. The tracking of merchandise may also be conducted via the capturing of bar code or other type of scanning component that may be embedded in the input device 104, camera 600, video camera, cell phone, black box 901 etc. and uploaded with the image.

After shopping in the store, the avatars may leave the virtual store and walk down a virtual representation of a real street, where they may enter stores to purchase items, etc. The GPS system 212 will keep track of their location in the virtual environment.

In a digital city environment, the individual's avatar may walk up to the store front, activating an intelligent sensor that sends a signal to the QIE engine 203 to activate the actual live storefront that is transmitted by satellite 210 or activate the thematic environment that has been stored in the thematic engine 201 for processing the store, inventory, hologram/avatar of the owner/sales associate, merchandise, transactions/purchasing, and store walkthrough.

The avatars may access the city as well, and may ride a train, take a taxi, chat with other avatars, sit and read a book in the park, visit a museum, go sightseeing etc. Avatars may be in the form of holograms, and may appear within the application and/or game environment based on the storylines and their roles for providing messages, goods, and services. The holographic avatars are formed using the holographic engine of U.S. Pat. No. 7,373,377.

At any time the merchandise may be viewed in a "real world" view by the user "clicking on" the merchandise using the input selection means. The identification of the merchandise (i.e., designer, size, color, store/seller etc.) is on the virtual tag and the 2D, 3D image will reflect the actual merchandise for purchase.

In another instance, the individual can try the merchandise. The images of the user/person are projected onto the system via an image capturing system 600 and/or connected to a high processing computer system or other similar system, and when the user selects the merchandise, the program 110 automatically configures the clothing onto the individual's image that has been projected. In one embodiment, the program 110 uses a hologram to demonstrate the merchandise, if a holographic engine is utilized. An avatar of the person/user who is purchasing and trying on the merchandise, will appear with the selected merchandise.

Once a user purchases an item, the program 110 removes it from inventory and places the merchandise into a "bag", which means that the item in the real-world, is sent to the user by mail or courier. Thus, the program 110 no longer associates that item with the store (thematic engine 201) or inventory. If a user returns an item, then the program 110 adds that item to the inventory, and the user is given a period of time by the program 110, to return the item. If the items purchased or returned are virtual items used in game play, then the program 110 moves those items to the game inventory for the user's user during the game.

In one embodiment, if the merchandise date is beyond a predetermined time that it was introduced to the "floor" for sale (e.g., 30 days), the program 110 may be programmed to send the merchandise to a charity of the third party, vendor, or user's choice. The merchandise may also be returned to the vendor or third party, by the program 110, for further processing.

In the virtual environment, if any merchandise on the site needs a ticket or needs a mark-down, the user may bring the merchandise in the virtual environment, to the zone supervisor/avatar to add a ticket or mark-down the merchandise, respectively. This is carried out by the program 110 sending a signal via the thematic environment to the tagging engine 1305 to create a tag, or the mark-down engine 1308 to mark down the merchandise with the appropriate dollar amount. Items may also be marked-up after a sale, for example.

In another embodiment if the ticket is removed by either falling off, is ripped off or taken, by another user/player/avatar, or is somehow lost, a signal is transmitted by the program 110 to the ticket creation engine 1306 to create a new ticket. The merchandise or service will be taken by the avatar to an inspection station or supervisor that has the authority to re-ticket or mark-down the item. The supervisor or inspection station is based on an AI model, and the program 110 will provide instructions to check that merchandise, and if it finds it needs information, it will communicate it directly, or it will be connected directly to the ticket creation engine 1306 via a communication link that sends information to the ticket creation engine 1306. The program 110 will submit a request either by the avatar scanning the item on a device in their cube, using a pen in their hand to mark-down or ticket the merchandise, type up the information, or pick up the telephone to "call" to obtain the correct pricing (from the inventor system). The ticket creation engine 1306 will re-produce the ticket on the goods or service and the ticket will include the date, vendor, and other pertinent information. The avatar will create and provide the ticket based on the data transmitted from the ticket creation engine 1306.

In yet another embodiment, the program 110 of the thematic environment will be polling the tickets via a markup/markdown engine 1308 that reviews the dates of the tickets on the tagged images or inventory, and will change the price point based on the date of the ticketed merchandise or service, automatically. The engine 1308 is connected to an AI engine 706 that requests the information and sends instruction to the Ticketing engine 1306 to process the markup, markdown, or ticket the merchandise. If the ticket has been "lost", the program 110 will send a request to the ticket creation engine 1306 to retag the image with the new date, time and information pertaining to that specific item or service. If the ticketed merchandise has its original tickets and the date exceeds, for example, seven days from the original date stamped, the goods or services may be programmed by the vendor, to be marked down 25% by the program 110. If the goods exceed, for example, 14 days from the original date stamped, the goods or services may be marked down an additional 25% or a total of 50% by the program 110. If the goods or services date exceeds, for example, 21 days from the original date stamped, the goods or services may be marked down by the program 110 an additional 25% or 75% total. If the goods or service exceed, for example, 30 days from the original date stamped, the goods may be released by the program 110 (based on vendor/user prior programming), to a charity of the user's choice or removed from the application/game until a future date for re-entry. In each case, the price is struck down by the program 110, and the new price appears on the ticket reflecting the mark down.

In one embodiment, the program 110 provides a runway application, where merchandise can be viewed and purchased at a runway site that is presented by the program 110 (i.e., thematic engine 201) to the user. The user may select the merchandise that is on the runway zone to purchase it. The merchandise can be purchased by either entering merchandise information into a section at the virtual booth or table where the fashion show is taking place, or the user may "click" directly to a link which takes the user to the fashion show website for purchase outside of the application/game.

In another example, a buyer for a major chain of stores, is sick and cannot attend the fashion show promoting new merchandise in Paris. The buyer needs to obtain the merchandise in a timely manner but has to be at the show to see the merchandise and also get the ratings. With the present invention, the buyer can log into the live fashion show via satellite transmission 210, "hot click" on the merchandise that they are interested in purchasing and purchase directly from the show. The individual/buyer can also view an archived version of the fashion show and purchase items from the archive. The merchandise can be shipped to any or all stores selected by the buyer. The merchandise is marked appropriately by the program 110 based on the buyers' merchandise code and all discounts are appropriately applied to the buyers purchase by the program 110. The merchandise will appear as either a graphic or live image within the store or online store. The merchandise can also be purchased by an individual when the individual "hot clicks" the item, enters the number, color, size that they are interested in purchasing, and enters the information as to where the goods are to be sent.

In another embodiment, the user may access a concert zone, and may purchase CDs or merchandise during or after the live concert. The music/video merchandise is displayed by the program 110 (i.e., thematic engine 201). As with the runway site, the user may enter their information for purchase at the box office of the concert zone site, or "click" directly on the video or a link, which takes the user to the performer's website for purchase outside of the application/game.

The user's purchases at both the runway and concert zones are tied by the program 110 to the accounting/billing system 202, which includes credit/debit cards, internet payment systems 1312, etc., and which are accessed via the registers or other payment information. The user may also use credit (real-world or virtual) that was purchased before the application/game play, that is being held in the credit office.

In another embodiment, the present invention includes an auction site engine 1310, where the user may participate in an auction that is being presented by the program 110 (i.e., thematic engine 201) in a particular zone of the virtual environment. The user may access an auction zone 211 where they can participate in the bidding, or simply watch the bidding. The user enters their information as the auction begins (see U.S. Pat. Nos. 7,970,652 and 7,904,347, which describe auction systems—the contents of which are herein incorporated by reference in their entirety).

The user may also "click" on an area that takes them out of the application and/or game to an auction site 211 to participate. At the auction zone 211, the user may preview the merchandise prior to the beginning of the auction, or preview the merchandise at the auction site outside the application and/or game. All the bidding by the user can be performed at the auction zone 211 or at the auction site 211 outside the application and/or game. The bidding by the user may be performed by the user entering the bid into text or "clicking" on bids presented by the program 110, or any other method. The program 110 connects the bidding to an auction engine 1310 that takes the information from the user and uses its own accounting/billing system 202, which includes credit/debit cards, internet payment systems 1312, etc., and which are accessed via a credit office or other payment information.

In yet another embodiment, in a game virtual environment, there may be an active auction site 211 (see FIGS. 5 and 11) embedded therein, or which can be linked to a private auction site 211 outside of the game, that has the merchandise to be auctioned. During play if an auction is to be started, the program 110 of the thematic environment sends a signal to the auction site engine 1310 providing the engine 1310 with the inventory and starting price, and limiting the time to only, for example, 24 hours to support worldwide time-zones (this also reflects a virtual world environment). The auction information is displayed in the booth area, rack or designated area in the game and/or real life application by the program 110, with the auction time and price being displayed live to the individuals either playing, viewing, or participating. The owner of the merchandise sets the pricing and the amount that is acceptable. Individuals may enter their bid based on the data input display 102. The bids may be entered in a location directly in the game and/or real life application or outside of the game and/or real life application on a separate web page or other application. The bidding is generated by the engine 1310 and is processed via the thematic environment. The person with the highest bid wins the auction unless specified by the owner of the goods that an approved price point has not been reached. If the auction site 211 is held outside of the application/game play, it will register the auction within the game as a 2D, 3D, or holographic reflection mimicking the live auction taking place outside of the game or application environment. The information will be submitted via communication links that transmits the information back and forth to the thematic environment for processing and display.

In one embodiment, a voice activation system 207 (see FIG. 5) may be incorporated to hold live auctions either inside or outside of the game and/or real life application environment. The voice activation system 207 may be embedded within the auction engine 1310 or outside of the engine 1310 and communicate the information in a format that is understood by the engine 1310. Depending upon the format, the Thematic Engine 201 may process the information automatically or pass it through the QIE engine 203 for processing and redirected back to the Thematic Engine 201.

In another embodiment the avatar/user will be able to barter his goods and services with one or more players in a separate bartering zone. The program 110 of the thematic application will obtain instructions from a "bartering" area that is open for business that user/avatar is interested in bartering. A bartering engine 1309 (see FIG. 11) will be developed using a "chat" and voice/video based system. The bartering can be part of the storyline or can be located in a "live" bartering location within the application/game that takes place between the two or more parties. The barterers will be required to enter their information into a "bartering database" (i.e., data storage 205) that will track the transactions between the barterers and association fees. The chat and voice activated system of the bartering system will be linked directly to a bartering database 205 made up of Vendor ID, Vendor Name, Parties Bartering Information, History of Discussion, Bartering/Association Fee, Address, Telephone number, Bonded or Not, Ratings (Approval), etc., of all parties involved. Each bartering event will be provided by the program 110 with a date and time stamp.

The user may retrieve images from the database 205 of items to be bartered, such that the avatars may view same. This database 205 may be dedicated to the bartered goods and services, or may be a temporary storage 1307 for the items/services. The items may be evenly exchanged, or exchanged with a credit or a payment to be made by the methods described above with respect to other payments in the site.

In yet another embodiment, one or more zones may have a set of advertisements of goods and services set up in different guises. One such guise may be a carnival attraction, such as a Ferris Wheel, that moves advertisements around the wheel in a circular motion, so that one advertisement after another comes into and leaves the user's view. The user can "click" on the advertisement/object in view, and the program 110 will bring a "real live image" into view, such that the user may consider it and decide to purchase the goods.

The user's purchases are tied by the program 110 to the accounting/billing system 202, which includes credit/debit cards, internet payment systems 1312, etc., and which are accessed via the registers or other payment information. The user may also use credit (real-world or virtual) that was purchased before the application/game play, that is being held in the credit office.

At any time, a GPS system 212 (see FIGS. 2 and 5) may be used by the user, to locate certain vendors, provide the user with the exact location of zones or merchandise, sale booths, auctions, or locations of the markdowns. The GPS system 212 may also be used to track other avatars (i.e., family members, friends, game players) that have been programmed or processed using the thematic application environment, QIE engine 203, and the character play and character state. The program 110 processes the information through a server-based GPS system 212 that services the environment, such as disclosed in U.S. Pat. No. 7,373,377.

In another embodiment the merchandise can be tracked using a GPS system 212 or tracker system to locate the merchandise or object in the store. By tracing the object the user/avatar has the potential of obtaining that object for purchase or negotiating to obtain the object.

In another embodiment, a merchandising application will be embedded in the application/game play to demonstrate or teach users how to merchandise goods in a "real world" environment. The program 110 (i.e., merchandising engine 1304) will take the user through a set of steps of negotiating, classifying, pricing, setting ads, buying ad space, marking up and down goods, and forecasting. This application can be set outside of the application/game play or within the application/game itself as a mini-application. The program 110 (i.e., thematic engine 201) communicates with the retail training application for merchandising to obtain the data for display, processing, and interaction.

In another embodiment, the program 110 of the thematic application environment may communicate with a psychic/astrology engine 1311 (see FIG. 11), for example. This allows the user/gamer to obtain their reading during the virtual "real-life" application and/or game. The program 110 will process the information based on the storyline and input from one or more avatars associated or directly connected via a communication link to the psychic engine 1311. The information regarding date, time and year of birth can be entered by typing in the information, or by voice recognition means 207. The information will transferred by the program 110 to the psychic engine 1311 for processing. The engine 1311 will return information based on their sun sign or the person may ask a question regarding their future. The user may also communicate with a live psychic who has their own zone or is part of a psychic zone. This may be done via chat, voice, holographs.

In yet another embodiment, payments may be made via a credit or debit card that can be purchased in any retail outlet, online, or within the game/application at the credit office in the game/application. The card can be authorized either prior to the game during login or during the game at the credit office. A check or internal dedicated credit card may also be used, as well as internet payment systems 1312. In the case of an internal dedicated credit card, a credit card, debit card, check, etc., may be used to order the dedicated credit card prior to the game, and can be picked up at the credit office for use. The money will be held in the credit office as a reserve and will only be used upon the purchase of goods. If goods are not purchased within a predetermined time frame (i.e., 24 hour period), the money is refunded back to the users account by the program 110 unless otherwise specified by the user. The dedicated credit card, credit card, internet payment system account 1312, or other form of payment is used to purchase real goods and services. If the user decides to purchase credit during the game/application play, the user may go to the credit office within the game and enter the information requested. The information is then communicated from the Thematic Environment by the program 110 to the account/billing system 202, and credit engine for processing. The account/billing system 202 and processing engine will process the information using a credit card processing application that can be an internet payment type of billing system 1312, or will provide a unique card number that is not associated with the dedicated credit card but is generated within the application/game and can be refilled at any time by that user only. The (dedicated) credit card will contain the information for the individual, billing, and credit for the game or application that is being played or used. The user will have an option of obtaining a refund within a predetermined period of time (i.e., in the first 15 days). If the user does not obtain a refund, the program 110 will send out a message to the user two days prior to the due date, asking if the user wants a refund, or if the user will allow the credit to remain in the credit office for a period of time (i.e., the next 30 days).

In one embodiment, the user may wish to sell merchandise in the virtual environment. The store locator engine 710 is connected through a GPS system 212 for locating the store and the number of stores if there are more than one. The user may populate the images to appear on one or all of the stores or several types of stores. The types may be categorized by the type of merchandise that is being sold but is not restricted to the type of store. For example a department store which sells apparel, bedding, appliances, etc., may be selected by the user, or a single location in a small town, where the user wants to sell their merchandise. It is up to the individual/user and the cost to be paid the vendor. The user is not limited to uploading the image to one store. The program 110 allows the individual to select the inventory system that is to be populated. This can be accomplished by selecting the system either from the camera 600, input device 104, black box 901, etc. Once the user's merchandise is sold, a signal is transmitted by the program 110 to the store(s) via a communication link and the store locator engine 710 which then transmits the information back to the inventory system 1200. The program 110 sends a signal forwarding information to the inventory system 1200 that the merchandise has been sold and the merchandise needs to be marked appropriately. The images are either automatically marked as sold by the program 110, or pulled from view by the program 110. This is accomplished via the tagging engine 1305 and the program's 110 inventory control system, but is not limited to this process. The inventory control system will depend on the store's configuration of the present system and how they implement the software.

In another embodiment utilizing the store locator system, the user can open up a store in a remote area and have the entire world view and purchase their merchandise and check to see "live" how many people are in your store, scan the merchandise, check the prices, talk to the owner or salesman directly, negotiate price if that is an option and put the merchandise on hold. Artists with paintings in their attics, for example, can demonstrate their style and artistic talent as they work and sell the works right from their studio or home, or possibly upload them to a web store for automatic pricing, tagging, viewing and purchase. Individuals who live in a remote part of the world and sell all their handmade products can raise money for their village or village school or children. With a simple input device such as a camera, video or other type, the user can capture images and is able to give their products an inventory and sales tag, which can be sold in any known store in any major city around the world once their inventory is uploaded. The individual has the option of selecting the stores to upload the images. This is done by selecting the store locator button located on the camera 600, input device, black box or other type of input device 104 that supports the Store locator engine 710.

It should be emphasized that the above-described embodiments of the invention are merely possible examples of implementations set forth for a clear understanding of the principles of the invention. Variations and modifications may be made to the above-described embodiments of the invention without departing from the spirit and principles of the invention. All such modifications and variations are intended to be included herein within the scope of the invention and protected by the following claims.

What is claimed is:

1. A method of providing merchandise for a user to purchase in a virtual environment, comprising:
    configuring a computer system to include a quantum imaging environment (QIE) comprising an interpreter configured to receive input information from a first device, interpret the input information into objects to be manipulated and accessed via another device, and place the objects into a predetermined format;
    the QIE further configured to interact with and accounting/billing system, a data storage, an inventory system comprising an inventory engine, and a digital content library of a thematic engine;
    ii) attaching a tracking mechanism including at least one of an RFID tag or chip, a bar code, a metallic ink, a predetermined company thread or an anti-counterfeiting dust, or a GPS tracker, to a piece of merchandise;
    iii) scanning the merchandise into the inventory system using a scanning device that recognizes said tracking mechanism;
    iv) capturing an image of the merchandise using an image capturing system by capturing said tracking mechanism;
    v) storing in the inventory system, said image of the merchandise;
    vi) cataloguing said image of the merchandise in the inventory system using said inventory engine; and
    vii) displaying a plurality of images of merchandise in the inventory system on a user display, to provide for real-life purchase of the merchandise by said user;
    wherein the storing of said image in the inventory system, the cataloguing of said image of the merchandise in the inventory system using the inventory engine of the computer system; the displaying of the plurality of images of merchandise in the inventory system on the display of the user, and the providing for real-life purchase of the merchandise by said user comprises transmission of data from the QIE according to a predetermined design structure and layout of a virtual merchandising environment provided by the thematic engine.

2. The method of claim 1, further comprising allowing the user to purchase at least one piece of merchandise from said plurality of images of merchandise in the inventory, wherein the purchase of the at least one piece of merchandise is from a virtual store.

3. The method of claim 2, wherein the said plurality of images of merchandise in the inventory system are from a real-life location, each real-life location which includes inventory that is displayed in the virtual store.

4. The method of claim 3, wherein upon the purchase being made, further comprises transmitting a signal using a store locator engine which is connected through a GPS system, and locating the virtual store and a corresponding real-life location; and
    transmitting information on the purchase back to the inventory engine.

5. The method of claim 4, wherein the signal forwards information to the inventory engine that the at least one piece of merchandise has been purchased.

6. The method of claim 5, further comprising:
    indicating the purchase by at least one of marking an image representing the purchase of the at least one piece of merchandise or pulling the image of the plurality of images from user view of the inventory system.

7. The method of claim 6, further comprising:
    at least one of allowing the user to select the virtual store or to select the inventory that is populated in the virtual store.

8. The method of claim 1,
    providing advertisements to the user while displaying the plurality of images of merchandise in the virtual environment.

9. The method of claim 1, further comprising:
providing the accounting/billing system to the user to accomplish the purchase, wherein said accounting/billing system includes at least one of credit/debit cards, internet payment systems, or real-world or virtual credit systems.

10. The method of claim 1, wherein a GPS system is used by the user to locate at least one of vendors, a location of zones or merchandise, or markdowns of the merchandise, sale booths, auctions, or avatars using the virtual environment.

11. The method of claim 1, further comprising:
displaying a plurality of avatars as store employees or buyers on the user display.

12. The method of claim 11, wherein the merchandise is applied to at least one of the plurality of avatars of the buyer to try the merchandise.

\* \* \* \* \*